(12) United States Patent
Lavallee et al.

(10) Patent No.: US 11,364,960 B2
(45) Date of Patent: Jun. 21, 2022

(54) VEHICLE WITH AN ACTUATOR FOR ADJUSTING A SUSPENSION ASSEMBLY

(71) Applicant: BOMBARDIER RECREATIONAL PRODUCTS INC., Valcourt (CA)

(72) Inventors: Jean-Simon Lavallee, St-Charles-Borromee (CA); Michel Bourassa, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 627 days.

(21) Appl. No.: 16/336,282

(22) PCT Filed: Sep. 26, 2017

(86) PCT No.: PCT/IB2017/055875
§ 371 (c)(1),
(2) Date: Mar. 25, 2019

(87) PCT Pub. No.: WO2018/060864
PCT Pub. Date: Apr. 5, 2018

(65) Prior Publication Data
US 2019/0217906 A1 Jul. 18, 2019

Related U.S. Application Data

(60) Provisional application No. 62/402,171, filed on Sep. 30, 2016.

(51) Int. Cl.
*B62D 55/116* (2006.01)
*B62M 27/02* (2006.01)
(Continued)

(52) U.S. Cl.
CPC ............ *B62D 55/116* (2013.01); *B62D 55/07* (2013.01); *B62D 55/10* (2013.01); *B62D 55/104* (2013.01);
(Continued)

(58) Field of Classification Search
CPC ...... B62D 55/116; B62D 55/07; B62D 55/10; B62D 55/104; B62K 23/04; B62K 23/06;
(Continued)

(56) References Cited

U.S. PATENT DOCUMENTS

| | | |
|---|---|---|
| 4,393,953 A | 7/1983 | Boulianne |
| 5,265,692 A | 11/1993 | Mallette |

(Continued)

OTHER PUBLICATIONS

Office Action issued from the USPTO dated Jun. 16, 2021 in connection with the U.S. Appl. No. 16/336,257 including PTO-892 Form.

(Continued)

*Primary Examiner* — Jacob D Knutson
*Assistant Examiner* — Abigail R Hymel
(74) *Attorney, Agent, or Firm* — BCF LLP

(57) ABSTRACT

A vehicle comprises a chassis, a seat, a motor, an endless drive track, and a rear suspension assembly supporting the endless drive track. The rear suspension assembly includes a left slide and right slide rail, at least one rear suspension arm being operatively pivotally connected to one of the slide rails and the chassis, with at least one coupling block being connected thereto. A rear stopper is connected to one of the slide rails, the rear stopper being disposed within a range of motion of the at least one coupling block in a first position and being disposed out of the range of motion of the at least one coupling block in a second position. The vehicle includes a control cable and an actuator, the rear stopper moving between the first and second positions when moving the actuator between first and second actuator positions.

24 Claims, 22 Drawing Sheets

(51) Int. Cl.
  *B62D 55/07* (2006.01)
  *B62D 55/10* (2006.01)
  *B62D 55/104* (2006.01)
  *B62K 23/04* (2006.01)
  *B62K 23/06* (2006.01)

(52) U.S. Cl.
  CPC .............. *B62K 23/04* (2013.01); *B62K 23/06* (2013.01); *B62M 27/02* (2013.01); *B62M 2027/026* (2013.01); *B62M 2027/028* (2013.01)

(58) Field of Classification Search
  CPC ............ B62M 27/02; B62M 2027/026; B62M 2027/028
  See application file for complete search history.

(56) References Cited

U.S. PATENT DOCUMENTS

| | | |
|---|---|---|
| 5,692,579 A | 12/1997 | Peppel et al. |
| 5,881,834 A | 3/1999 | Karpik |
| 6,206,124 B1 | 3/2001 | Mallette et al. |
| 6,234,264 B1 | 5/2001 | Boivin et al. |
| 6,450,280 B1 * | 9/2002 | Pepka .................... B62M 27/02 180/184 |
| 8,525,793 B2 | 9/2013 | Sentchenkoff et al. |
| 8,910,738 B2 | 12/2014 | Mangum |
| 9,022,156 B2 | 5/2015 | Bedard et al. |
| 9,114,852 B2 | 8/2015 | Fecteau et al. |
| 2001/0023787 A1 * | 9/2001 | Mallette ................ B62M 27/02 180/182 |
| 2005/0016784 A1 * | 1/2005 | Fecteau ................. B62K 25/06 180/182 |
| 2009/0050390 A1 * | 2/2009 | Mallette ................ B62M 27/02 180/193 |
| 2012/0166043 A1 | 6/2012 | Watson |
| 2012/0205173 A1 * | 8/2012 | Mallette ................ B62M 27/02 180/193 |
| 2013/0285339 A1 | 10/2013 | Bedard et al. |
| 2014/0013875 A1 | 1/2014 | Neeley |
| 2014/0353933 A1 * | 12/2014 | Hawksworth ...... B60G 17/0272 280/5.5 |
| 2015/0232140 A1 | 8/2015 | Bedard et al. |

OTHER PUBLICATIONS

International Search Report of PCT/IB2017/055875, Blaine R. Copenheaver, dated Feb. 2, 2018.

* cited by examiner

VEHICLE WITH AN ACTUATOR FOR ADJUSTING A SUSPENSION ASSEMBLY

CROSS-REFERENCE

The present application claims priority to U.S. Provisional Patent Application No. 62/402,171, entitled "Vehicle With An Actuator For Adjusting A Suspension Assembly," filed on Sep. 30, 2016, the entirety of which is incorporated herein by reference.

TECHNICAL FIELD

The present technology relates generally to a vehicle with an actuator for adjusting a suspension assembly.

BACKGROUND

Snowmobiles are designed for travel on a variety of surfaces and terrains, rough and smooth, soft and rigid, level and inclined upwards or downwards. While the snowmobile engine drives the snowmobile, its suspension system provides stability and control for proper operation of the snowmobile. The suspension system is additionally designed to provide cushioning from the unevenness of the surface being travelled upon, and thereby, to provide a comfortable riding experience. Snowmobiles and snowmobile suspension systems are generally adapted for different uses, such as for utility or for recreation. The configuration of a snowmobile and its suspension system can also be optimized for different riding conditions, such as terrain roughness, inclination and other trail conditions.

A versatile snowmobile should be usable by different riders in different riding conditions. It is therefore desirable to have a snowmobile with adjustable configurations, so that the snowmobile can be optimized for different riding conditions, and to have this adjustment be simple, robust and reliable. Further, riding conditions may change during operation of the snowmobile. It is therefore desirable for a user to be able to make the adjustment while operating the snowmobile.

Suspension systems for snowmobiles are often configured for independent motion of a forward suspension arm and a rear suspension arm (as a five-bar mechanism), which allows front or rear portions of the suspension system to react independently. This can provide for dynamic response of the snowmobile, especially to bumpy terrain or accelerations. It is also known to provide coupling systems, which couple the motion of the forward and rear suspension arms, thereby creating a four-bar mechanism. When coupled, the front and rear portions of the suspension system react together to raise over bumps and rough terrain.

The user may decide to deactivate the coupling system, such that they get the most dynamic ride. Riding conditions may change during operation of the snowmobile, however, and the user may want to activate the coupling system. The terrain roughness may change significantly while riding downhill, for instance, and the user may wish to adjust the suspension system without stopping or dismounting the snowmobile. It is therefore desirable for the user to be able to make the adjustment during operation of the snowmobile.

Therefore, there is a need for a system for activating or deactivating a coupling system of a rear suspension assembly of a snowmobile which can be used by the user during operation of the snowmobile.

SUMMARY

It is an object of the present invention to ameliorate at least some of the inconveniences present in the prior art.

In according to one aspect of the present technology, there is provided a vehicle, comprising a chassis; at least one seat connected to the chassis; a motor connected to the chassis; an endless drive track disposed below the chassis, the endless drive track being operatively connected to the motor for propulsion of the vehicle; a rear suspension assembly supporting the endless drive track. The rear suspension assembly comprises a left slide rail, a right slide rail, at least one rear suspension arm having a first end and a second end, the first end of the at least one rear suspension arm being operatively pivotally connected to at least one of the left and right slide rails, the second end of the at least one rear suspension arm being operatively pivotally connected to the chassis, at least one coupling block connected to the at least one rear suspension arm, and at least one rear stopper movably connected to the at least one of the left and right slide rails, the at least one rear stopper being movable between a first stopper position and a second stopper position, the at least one rear stopper being disposed within a range of motion of the at least one coupling block when in the first stopper position, the at least one coupling block selectively abutting the at least one rear stopper when the first end of the at least one rear suspension arm extends rearward, the at least one rear stopper being disposed out of the range of motion of the at least one coupling block when in the second stopper position, motion of the at least one coupling block being unimpeded by the at least one rear stopper when the first end of the at least one rear suspension arm extends rearward; a control cable having a first end operatively connected to the at least one rear stopper of the rear suspension assembly; and an actuator operatively connected to a second end of the control cable and the at least one rear stopper via the control cable, the actuator being disposed forward of the at least one seat, the actuator being operable by a user during operation of the vehicle, the actuator being movable between a plurality of actuator positions including at least a first actuator position and a second actuator position, a position of the at least one rear stopper being related to a selected one of the plurality of actuator positions, the at least one rear stopper moving to the first stopper position when moving the actuator to the first actuator position, the at least one rear stopper moving to the second stopper position when moving the actuator to the second actuator position.

In some implementations, the at least rear stopper moves between the first stopper position and the second stopper position by rotation.

In some implementations, the vehicle further comprises at least one rocker arm having a first end and a second end; and wherein the first end of the at least one rocker arm is pivotally connected to at least one of the left and right slide rails; and the second end of the at least one rocker arm is pivotally connected to the first end of the at least one rear suspension arm.

In some implementations, the vehicle further comprises a cross-member connected to the first end of the at least one rear suspension arm; wherein the at least one rocker arm includes a right rocker arm pivotally connected to the right slide rail at a first end of the right rocker arm, and a left rocker arm pivotally connected to the left slide rail at a first end of the left rocker arm; the at least one coupling block is operatively connected to one of the right rocker arm, and the left rocker arm; a second end of the right rocker arm is connected to the cross-member; a second end of the left rocker arm is connected to the cross-member; and the at least one rear stopper is rotatably connected to the right slide rail if the at least one coupling block is connected to the right rocker arm, and the left slide rail if the at least one coupling block is connected to the left rocker arm.

In some implementations, the at least one coupling block is connected to at least one of the first end of the cross-member and the second end of the cross-member.

In some implementations, the at least one coupling block includes a right coupling block connected to the right rocker arm, and a left coupling block connected to the left rocker arm; the at least one rear stopper includes a right rear stopper connected to the right slide rail, and a left rear stopper connected to the left slide rail; and further comprises a shaft connecting to and extending between the right rear stopper and the left rear stopper, the right and left rear stoppers being rotationally fixed with respect to the shaft, the shaft being adapted for rotating the right and left rear stoppers such that the right and left rear stoppers are in a same one of the first and second stopper positions.

In some implementations, the vehicle further comprises a right mounting portion connected to a right end portion of the shaft, the right rear stopper being connected to the right mounting portion; and a left mounting portion connected to a left end portion of the shaft, the left rear stopper being connected to the left mounting portion, the right and left mounting portions being rotationally fixed with respect to the shaft.

In some implementations, the vehicle further comprises a biasing element operatively connected to at least one of the right and left mounting portions, the biasing element biasing the right and the left rear stoppers, via the at least one of the right and left mounting portions, toward the first stopper position.

In some implementations, the control cable is connected to an other one of the at least one of the right and left mounting portions; moving the actuator from the first actuator position to the second actuator position applies a tension on the control cable, the tension of the control cable, via the other one of the at least one of the right and left mounting portions, causing the shaft to rotate the right and left rear stoppers from the first stopper position to the second stopper position; and moving the actuator from the second actuator position to the first actuator position releases the tension on the control cable, the biasing element then biasing the shaft to rotate the right and left rear stoppers from the second stopper position to the first stopper position.

In some implementations, the control cable is connected to the left mounting portion; and the biasing element is connected to the right mounting portion.

In some implementations, the biasing element is a torsion spring.

In some implementations, the torsion spring is disposed about an axis of rotation of the shaft.

In some implementations, the vehicle further comprises at least one body panel connected to the chassis; and a portion of the control cable is disposed in an interior of the at least one body panel.

In some implementations, the vehicle further comprises a handlebar connected to the chassis; and the actuator is a twist grip actuator disposed on the handlebar; and the twist grip actuator is movable between at least the first actuator position and the second actuator position by twisting the twist grip actuator about the handlebar.

In some implementations, the vehicle further comprises a left handle disposed on a left side portion of the handlebar; a brake lever disposed on the left side portion, the brake lever being connected to a brake fluid reservoir, the brake fluid reservoir being connected to the handlebar rightward of the left handle; a right handle disposed on a right side portion of the handlebar; a throttle lever disposed on the right side portion, a left end portion of the throttle lever being connected to the handlebar leftward of the right handle; and the twist grip actuator is disposed between one of the left handle and the brake fluid reservoir, and the right handle and the left end portion of the throttle lever.

In some implementations, the vehicle further comprises a handle disposed on a side portion of the handlebar and the twist grip actuator is disposed on the handlebar laterally inward of the handle.

In some implementations, the twist grip actuator is less than 5 cm from a laterally inward edge of the handle.

In some implementations, the vehicle further comprises a handlebar riser disposed between the handlebar and the chassis; at least one body panel connected to the chassis; and the control cable runs from the twist grip actuator, along the handlebar, along the handlebar riser and in an interior of the at least one body panel to one of the at least one rear stopper.

In some implementations, the vehicle further comprises a handlebar connected to the chassis and the actuator is a lever actuator disposed on the handlebar; and the lever actuator is movable between at least the first actuator position and the second actuator position by at least one of pushing the lever actuator, and pulling the lever actuator.

In some implementations, the vehicle further comprises at least one body panel connected to and disposed above the chassis; and the actuator is connected to the at least one body panel.

In some implementations, the vehicle further comprises a handlebar riser connected to the chassis; and the actuator is disposed on the handlebar riser.

In some implementations, the vehicle is a snowmobile; the chassis includes a tunnel, the rear suspension assembly being connected to the tunnel; and the vehicle further comprises a front right ski connected to a front right portion of the chassis; and a front left ski connected to a front left portion of the chassis.

In some implementations, the vehicle further comprises a straddle seat disposed on the chassis; and the actuator is disposed forward of the straddle seat.

In some implementations, the vehicle further comprises at least one body panel; and the tunnel includes at least one tunnel side wall; the rear suspension assembly includes at least one front suspension arm; and the control cable runs from the actuator, through the at least one body panel, into an interior of the at least one body panel, along an exterior of the at least one tunnel side wall, through the at least one tunnel side wall, along one of the at least one front suspension arm, and along the one of the left and right slide rail.

For purposes of the present application, terms related to spatial orientation when referring to the snowmobile and components in relation to the snowmobile, such as "forward", "rearward", "left", "right", "above" and "below", are as they would be understood by a driver of the snowmobile sitting thereon in a normal riding position, with the snowmobile in a straight ahead orientation (i.e. not steered left or right), and in an upright position (i.e. not tilted). When referring to a component alone, terms related to spatial orientation are described with respect to the component as disposed on the snowmobile. The definitions provided above regarding the above terms take precedence over definitions of these terms that may be found in any one of the documents incorporated herein by reference.

Implementations of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of implementations of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Although the present technology is described below with respect to a snowmobile, it is contemplated that aspects of the present technology could be applied to other vehicles with suspensions supporting an endless track, including, but not limited to: side-by-side vehicles (SSVs) and all-terrain vehicles (ATVs).

Figure 1:
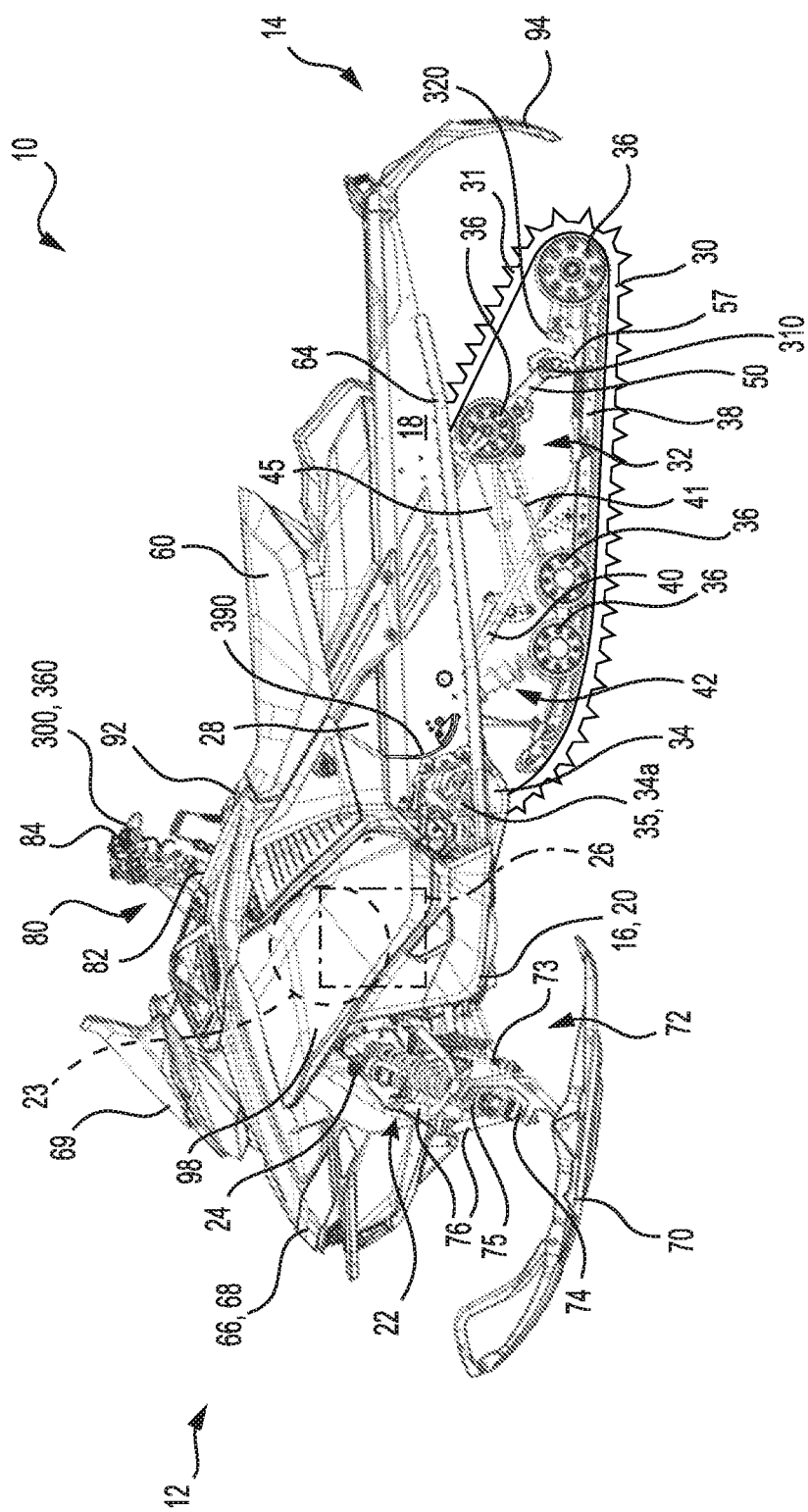
FIG. 1 is a left side elevation view of a snowmobile according to one implementation of the present technology.
Figure 2:
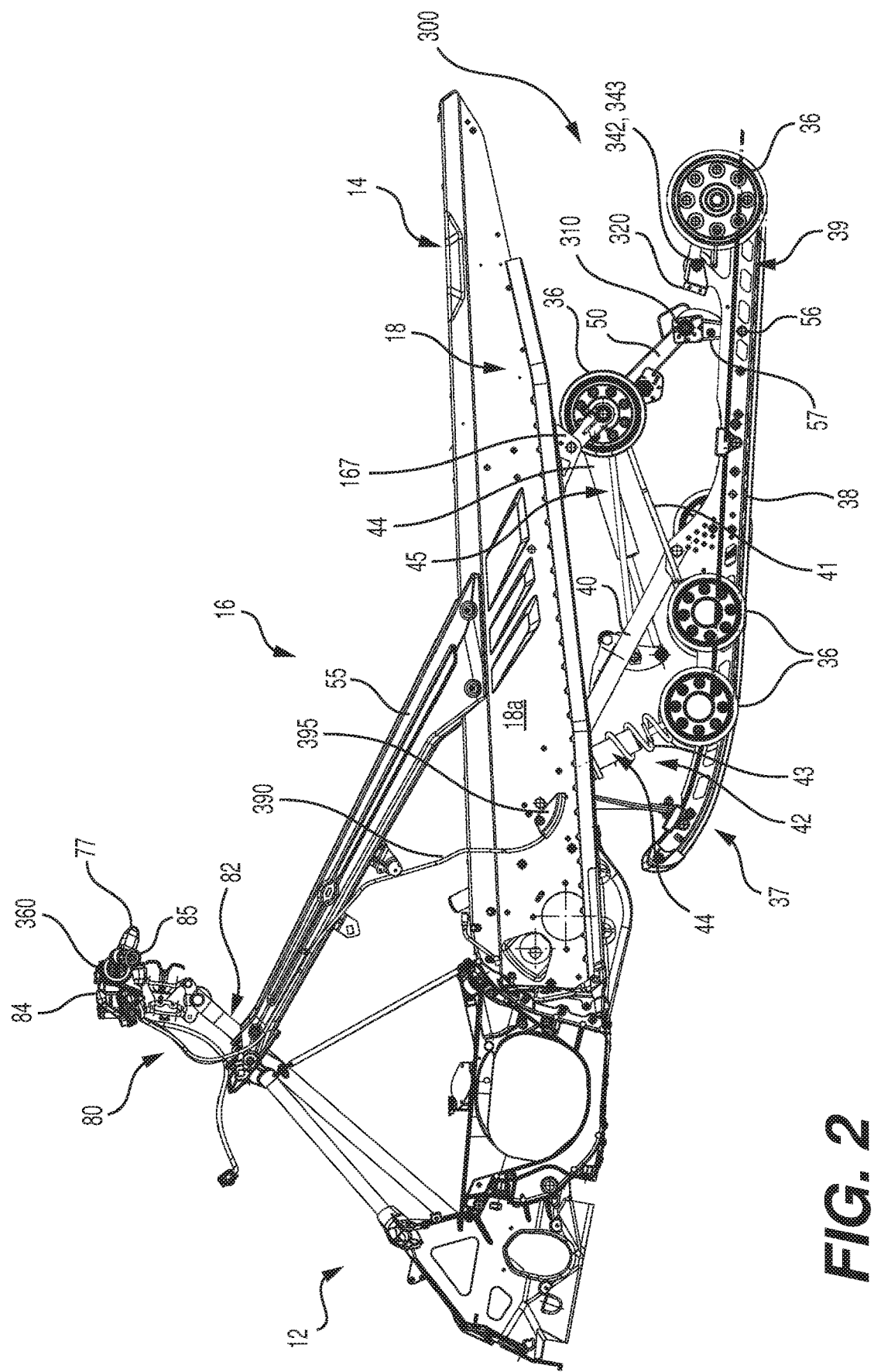
FIG. 2 is a left side elevation view of portions of a chassis and a rear suspension assembly of the snowmobile of FIG. 1.

With reference to FIGS. 1 and 2, a snowmobile 10 includes a front end 12 and a rear end 14 which are defined consistently with a forward travel direction of the vehicle 10. The snowmobile 10 includes a vehicle body in the form of a frame or chassis 16 which includes a rear tunnel 18, an motor module 20, a front suspension module 22 and an upper structure 24. The tunnel 18 is formed from sheet metal parts assembled to form an inverted U-shape when viewed from the front or rear end 12, 14. The inverted U-shaped tunnel 18 has a left side portion 18a and a right side portion 18a (only the left being shown).

A motor 26, schematically illustrated in FIG. 1, is carried in a motor compartment defined by the motor module 20 of the chassis 16 and provides, in part, propulsion of the snowmobile 10. In the illustrated implementation, the motor 26 is an internal combustion engine 26, but it is contemplated that it could be, for example, an electric motor or a hybrid. A fuel tank 28, supported above the tunnel 18, supplies fuel to the engine 26 for its operation.

An endless drive track 30 is positioned generally under the tunnel 18, and is operatively connected to the engine 26 via a drivetrain including a belt transmission system (not shown). The endless drive track 30 is driven to run about a rear suspension assembly 32 connected to the chassis 16 for propulsion of the snowmobile 10. The endless drive track 30 has a plurality of lugs 31 extending from an outer surface thereof to provide traction to the track 30.

The rear suspension assembly 32 includes a pair of drive sprockets 34 mounted on a drive axle 35, multiple idler wheels 36 and a pair of slide rails 38 in sliding contact with the endless drive track 30. Each slide rail 38 includes a front portion 37 and rear portion 39. The drive axle 35 having the drive sprockets 34 mounted thereon defines a drive axle axis 34a. The slide rails 38 are attached to the tunnel 18 by a front suspension arm 40 and a rear suspension arm 50. The rear suspension assembly further includes a front shock absorber assembly 42 and a rear shock absorber assembly 45, each of which includes a shock absorber 44. The front shock absorber assembly 42 includes a coil spring 43 surrounding the shock absorber 44. The rear shock absorber 45 has adjacent torsion springs 41 bias the slide rails 38 away from the tunnel 18. It is contemplated that the snowmobile 10 could be provided with a different implementation of a rear suspension assembly 32 than the one shown herein. The rear suspension assembly 32 will be discussed in more detail below.

A straddle seat 60 is positioned atop the fuel tank 28. The seat 60 is adapted to accommodate a driver of the snowmobile 10. The seat 60 can also be configured to accommodate a passenger. A fuel tank fill opening covered by a cap 92 is disposed on the upper surface of the fuel tank 28 in front of the seat 60. It is contemplated that the fuel tank fill opening 92 could be disposed elsewhere on the fuel tank 28. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, fairings 66 enclose the engine 26, the continuous variable transmission system 23 and other components of the powerpack such as the air intake system. The fairings 66 include a hood 68 which can be opened to allow access to the engine 26 and other internal components of the snowmobile 10 from the top and the front which may be required, for example, for inspection or maintenance of the engine 26 and/or the powerpack. The fairings 66 also include two side panels 98 extending along the left and right sides of the snowmobile 10. The engine 26 and the transmission system 23 are disposed between the side panels 98. The side panels 98 are both removably connected to the chassis 16 and/or to other fairing panels and can be removed to access the internal components from the corresponding lateral side. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the chassis 16 through a front suspension assembly 72. The front suspension module 22 is connected to the front end of the motor module 20. The front suspension assembly 72 includes ski legs 74, shock absorbers 75, supporting arms 76 and ball joints (not shown) for operatively connecting to the respective ski leg 74.

A steering assembly 80, including a steering column 82 and a handlebar 84, is provided generally forward of the seat 60. The steering column 82 is rotatably connected to the chassis 16, including by two frame members 55 extending from the steering column 82 to the tunnel 18. The lower end of the steering column 82 is connected to the ski legs 74 via a steering rod 73. The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A left handle 85 and a right handle 85 are disposed on left and right sides of the handlebar 84 respectively. A throttle operator 77 in the form of a thumb-actuated throttle lever is mounted to the right side of the handlebar 84. Other types of throttle operators, such as a finger-actuated throttle lever, are also contemplated. A brake actuator 79, in the form of a hand brake lever 79, is provided on the left side 83 of the handlebar 84 for braking the snowmobile 10 in a known manner. A right end of the brake lever 79 connects to a brake fluid reservoir 179 connected to the handlebar 84 rightward of the handle 85 (see FIG. 12). It is contemplated that the windshield 69 could be connected directly to the handlebar 84.

At the rear end 14 of the snowmobile 10, a snow flap 94 extends downward from the rear end of the tunnel 18. The snow flap 94 protects against snow and/or debris that can be projected rearward from the drive track 30 when the snowmobile 10 is being driven. The snow flap 94 also projects snow onto a heat exchanger that is used to cool liquid for cooling the engine 26.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 3:
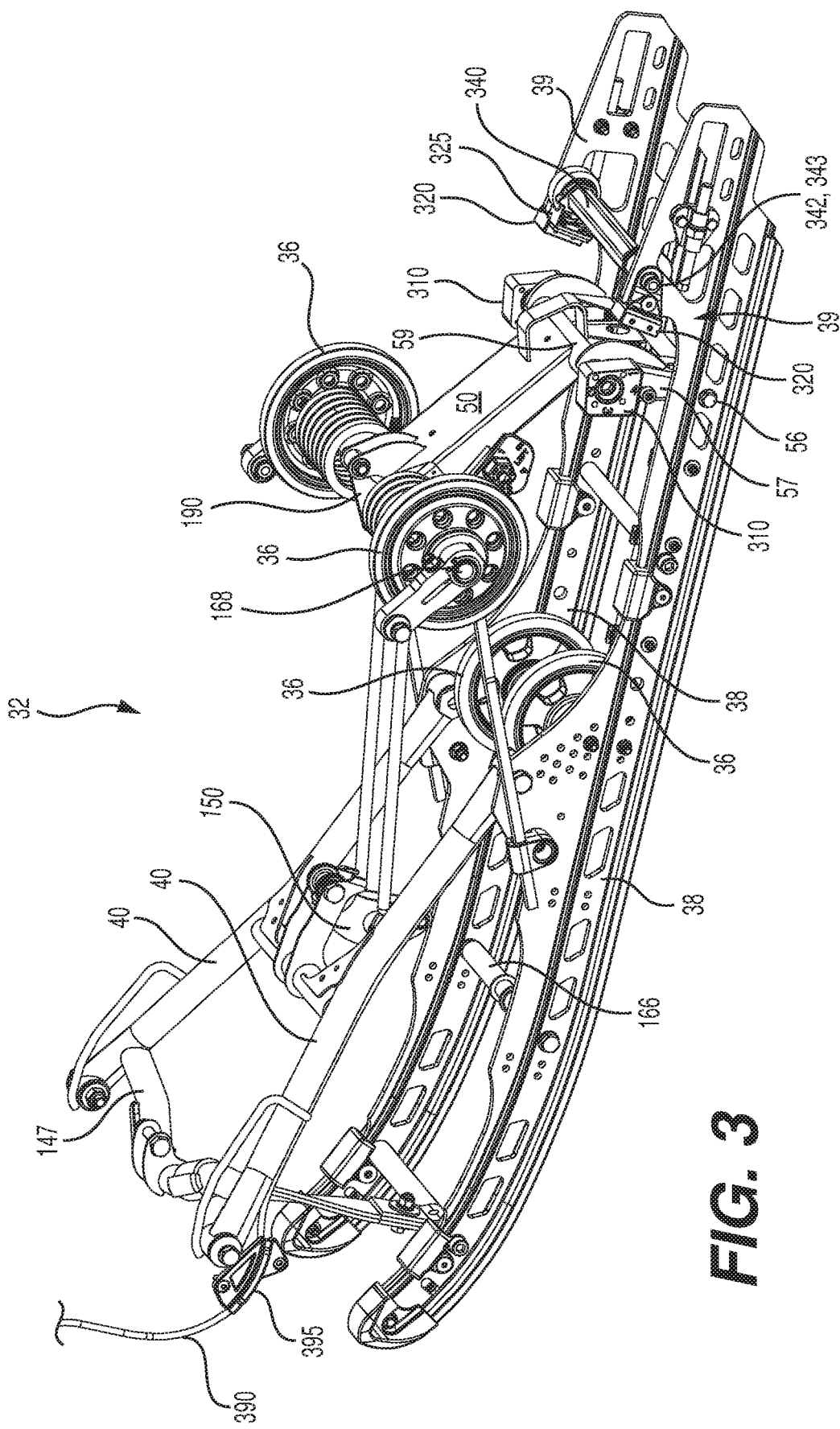
FIG. 3 is a top, rear, left side perspective view of portions of the rear suspension assembly of FIG. 2.
Figure 4:
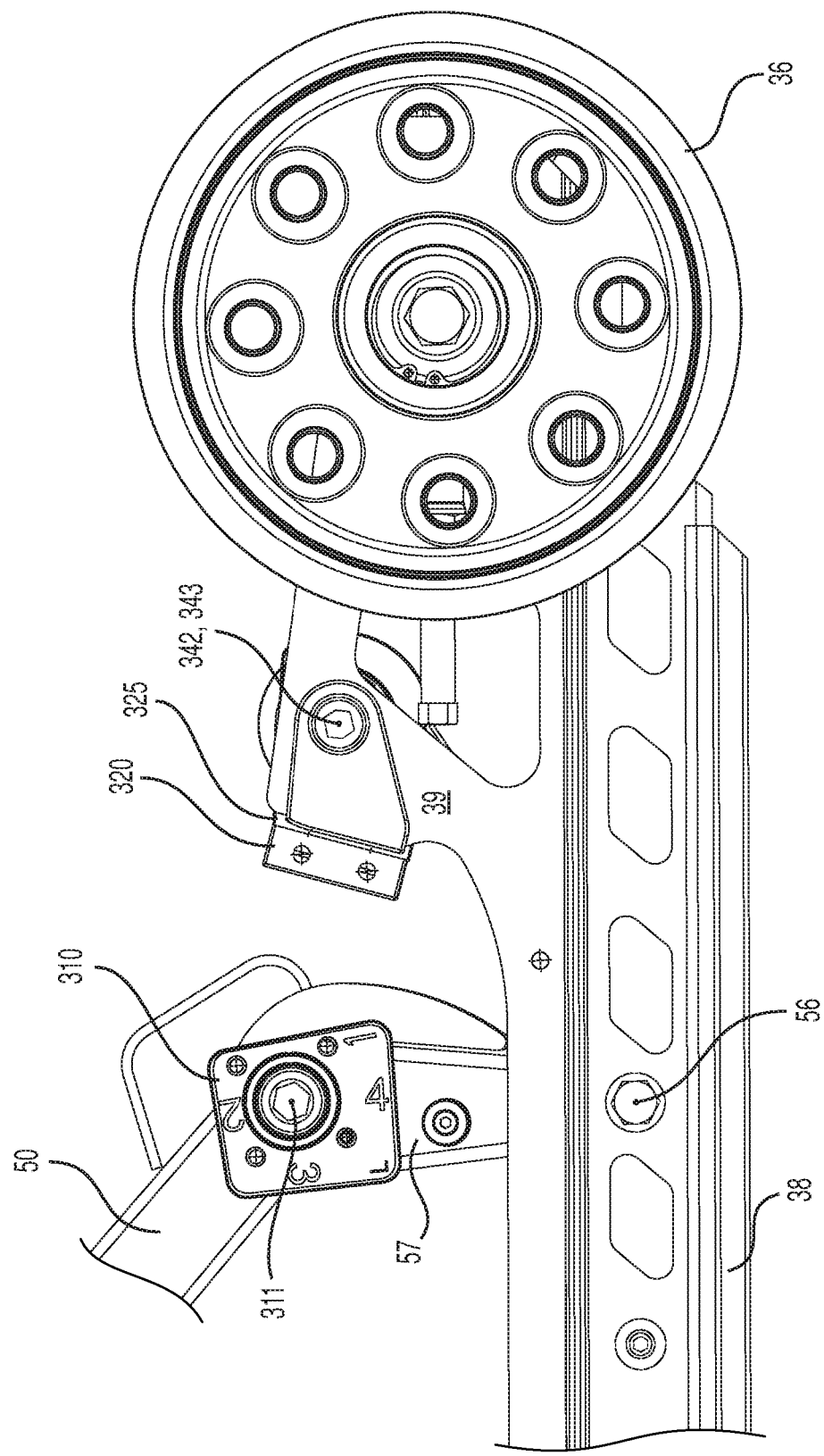
FIG. 4 is a close-up, left side elevation view of the rear suspension system assembly of FIG. 2, with a rear stopper in a coupling position.
Figure 5:
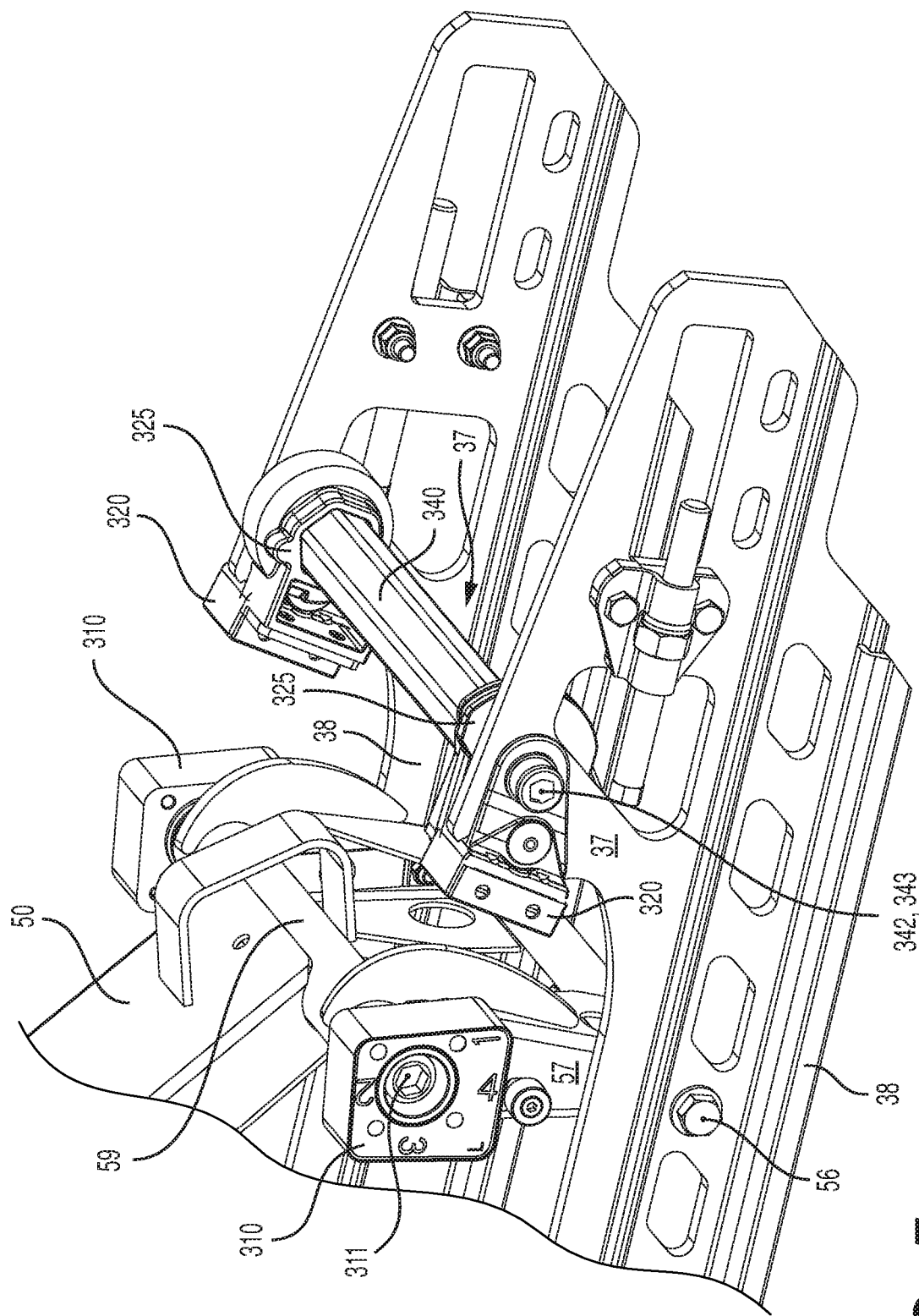
FIG. 5 is a close-up, top, left, perspective view of the portions of the rear suspension assembly of FIG. 4.

With reference to FIGS. 1 to 3, portions of the rear suspension assembly 32 will now be discussed in more detail. As mentioned above, the rear suspension assembly 32 includes a pair of slide rails 38. The slide rails 38 are connected to pairs of rear idler wheels 36 engaging the endless track 30, at the front 37 and rear 39 portions of the slide rails 38.

The rear suspension assembly 32 includes the front suspension arm 40 and the rear suspension arm 50 disposed rearward of the front suspension arm 40. The front and rear suspension arms 40, 50 extend forwardly and upwardly from the slide rails 38 and support the tunnel 18. The front and rear suspension arms 40, 50 are made of metal tubes of a generally circular cross-section. It is contemplated that the front and rear suspension arms 40, 50 could have other cross-sections, and that the front and rear suspension arms 40, 50 could be of another material than metal.

The front suspension arm 40 is pivotally connected to the tunnel 18 at an upper end. At a lower end, the front suspension arm 40 is pivotally connected to the slide rails 38. The front shock absorber assembly 42 extends rearwardly and downwardly from the tunnel 18 to the slide rails 38. Specifically, the front shock absorber 42 is pivotally connected to the upper bar 147 of the front suspension arm 40 and a cross-bar 166 extending between the slide rails 38 (see FIG. 3).

The rear suspension arm 50 is rotatably connected at an upper end to a shaft 168, the shaft 168 being mounted to the tunnel 18, via brackets 167, at its left and right ends. A lower end of the rear suspension arm 50 is fixedly connected to a hollow shaft 59. The rear suspension assembly 32 also includes a left rocker arm 57 and a right rocker arm 57. Upper ends of the left and right rocker arms 57 are pivotally connected to corresponding left and right ends of the hollow shaft 59. Each of the left and right rear rocker arms 57 is pivotally attached at its lower end to the rear portion 39 of each slide rail 38 at a pivot point 56. It is contemplated that the rocker arms 57 could be omitted and that the rear suspension arm 50 and the hollow shaft 59 could be pivotally connected directly to the slide rails 38. As will be described below, some implementations may use two rear suspension arms 50, each arm 50 connecting directly to its corresponding slide rail 38.

The rear shock absorber 45 extends forwardly and downwardly from the tunnel 18, and is disposed at least in part rearwardly of the front suspension arm 42. The rear shock absorber 45 is pivotally connected at its upper end to the tunnel 18 via a rear bracket 190 connected to a top end of the rear suspension arm 50. A lower end of the rear shock absorber 42 is pivotally connected to the front suspension arm 40 via brackets 150.

Further details for suspension arms and shock absorber assemblies similar to the suspension arms 40, 50 and the shock absorber assemblies 42, 45 can be found in U.S. Pat. No. 9,114,852, issued Aug. 25, 2015, the entirety of which is incorporated herein by reference.

The pivoting of the suspension arms 40, 50 changes the relative angle and vertical separation between the slide rails 38 and the tunnel 18 to enable bump absorption as the snowmobile 10 travels over uneven or rough terrain. In the configuration of the arms 40, 50 and shock absorber assemblies 42, 45 described above, the rear suspension assembly 32 has the kinematic properties of a five-bar mechanism, as is generally known in the art. The movement of the front and rear portions 37, 39 of the slide rails 38 is generally uncoupled, such that the front suspension arm 40 and the front shock absorber assembly 42 can react independently from the rear suspension arm 50 and the rear shock absorber assembly 45. Movement of the front portions 37 of the slide rails 38 relative to the tunnel 18 causes the front suspension arm 40 to rotate relative to the tunnel 18. Likewise, movement of the rear portions 39 of the slide rails 38 relative to the tunnel 18 causes the rear suspension arm 50 and the rocker arms 57 to rotate relative to the tunnel 18. This uncoupled motion allows the slide rails 38, and the endless track 30, to pass up and over smaller obstacles without needing to compress the whole rear suspension assembly 32.

When the snowmobile 10 encounters a more substantial obstacle, however, it may be desirable to have all the rear suspension assembly 32 absorb the disturbance. This can be achieved by coupling the otherwise independent front and rear suspension arms 40, 50 and their accompanying shock absorber assemblies 42, 45. When coupled, the slide rails 38 remain substantially horizontal while rising over the bump. That the slide rails 38 remain generally horizontal as they rise vertically can improve the comfort for the user. When the front portions 37 of the slide rails 38, for example, rise over a bump independently of the rear portions 39, an angular acceleration on the rider is created which is generally more uncomfortable than a merely vertical acceleration. In the coupled configuration, the suspension assembly 32 has the kinematic properties of a four-bar mechanism.

The coupled configuration of the rear suspension assembly 32 is accomplished through the use of one or more coupling blocks 310 connected to the rear suspension arm 50 in cooperation with one or more corresponding rear stoppers 320 connected to one or both of the slide rails 38. In the present implementation, the snowmobile 10 includes two coupling blocks 310 and two rear stoppers 320. Both the blocks 310 and the stoppers 320 will be described in more detail below. In standard operation, the rear suspension arm 50 (and the rocker arms 57) rotate generally independently from the front suspension arm 40. When encountering a sufficiently large bump, the rocker arms 57 rotate clockwise (as seen from the left) until the coupling blocks 310 abut the rear stoppers 320. The rear stoppers 320 impede further clockwise movement of the rocker arms 57, thus eliminating one degree of freedom from the rear suspension assembly 32, thereby converting the five-bar mechanism to the four-bar mechanism. As is known in the art, the four-bar mechanism thus couples movement of the front and rear suspension arms 40, 50.

Further details for coupling arrangements in suspension assemblies similar to the coupling blocks 310 and the rear stoppers 320 can be found in U.S. Pat. No. 6,206,124, issued Mar. 27, 2001, the entirety of which is incorporated herein by reference.

Figure 6:
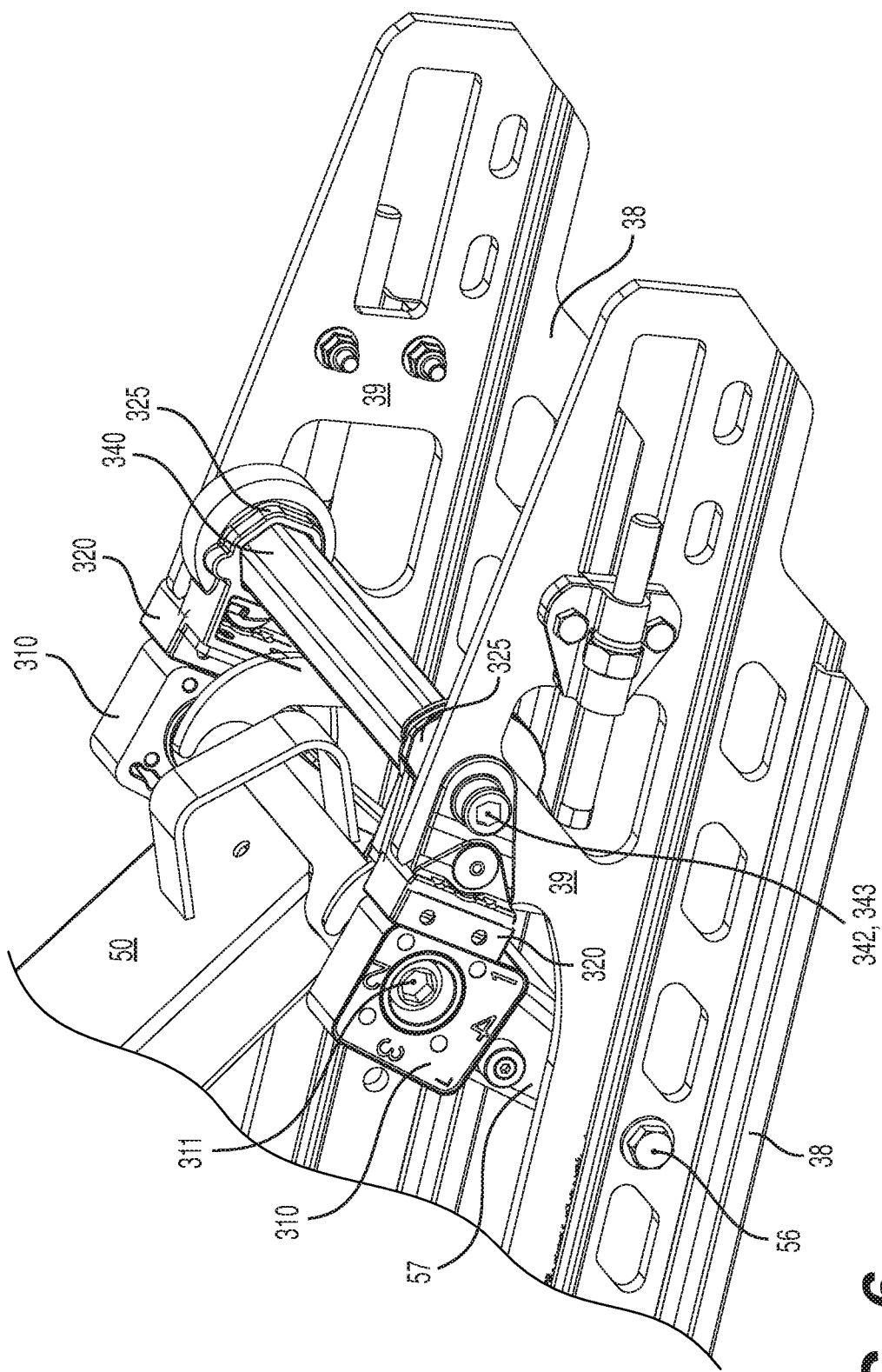
FIG. 6 is the close-up, perspective view of FIG. 5, with a coupling block abutting the rear stopper.
Figure 7:
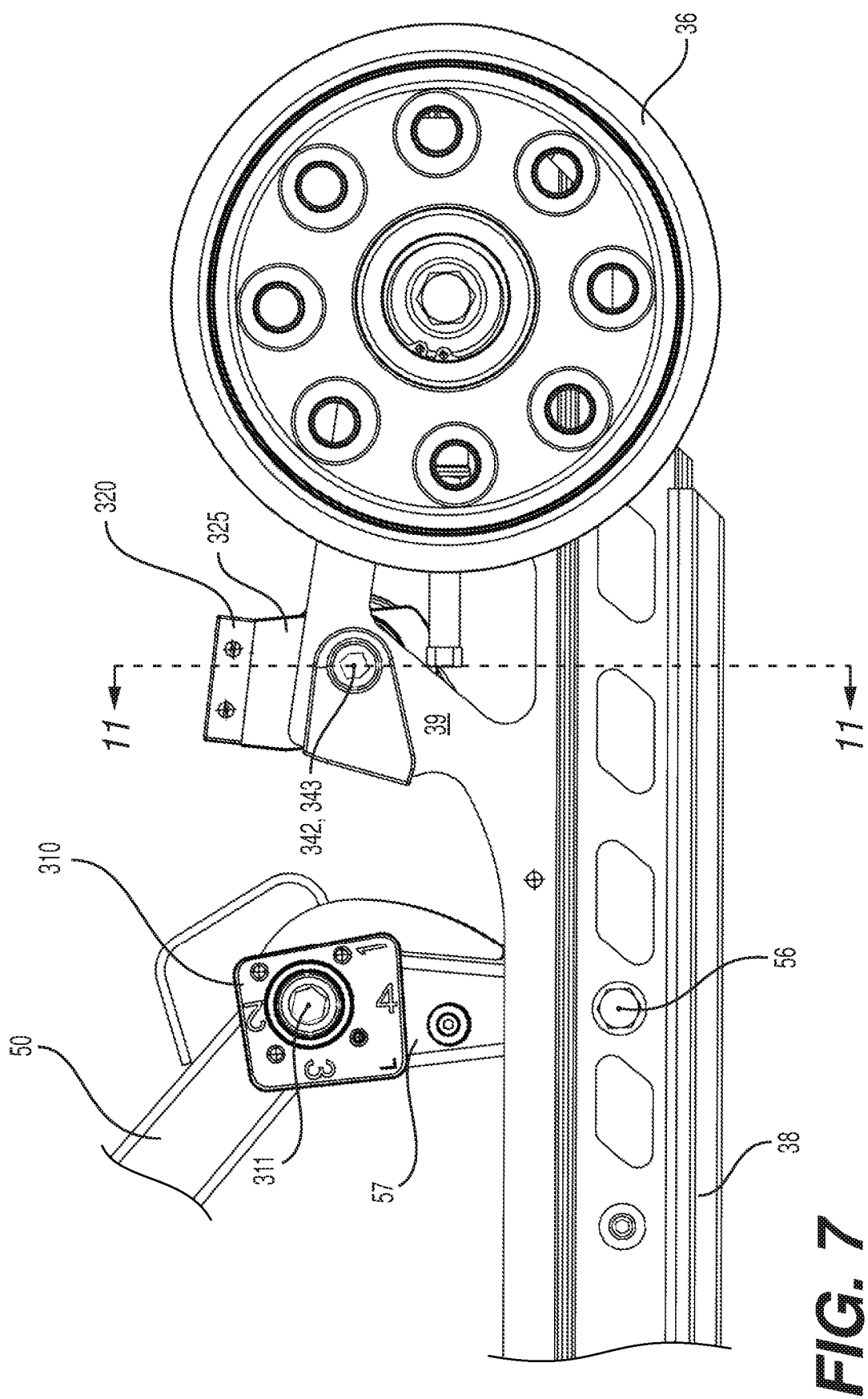
FIG. 7 is the close-up, left side elevation view of FIG. 4, with the rear stopper in a non-coupling position.

In some situations, however, the user may prefer that the rear suspension assembly 32 never couples, no matter the forces applied to or obstacles encountered by the slide rails 38. As will be described in more detail below, the rear stoppers 320 are pivotable between a coupling position and a non-coupling position. In the coupling position, illustrated in FIGS. 2 to 6, the rear stoppers 320 are disposed generally rearward of the coupling blocks 310, and the coupling configuration described above may occur. In the coupling position, the rear stoppers 320 are within a range of motion of the coupling blocks 310, as they move with the rear suspension arm 50 and the rear suspension arm 50 extends rearward. In FIG. 6, the coupling blocks 310 are shown abutting the rear stoppers 320 and the rear suspension assembly 32 is in the coupled configuration.

Figure 8:
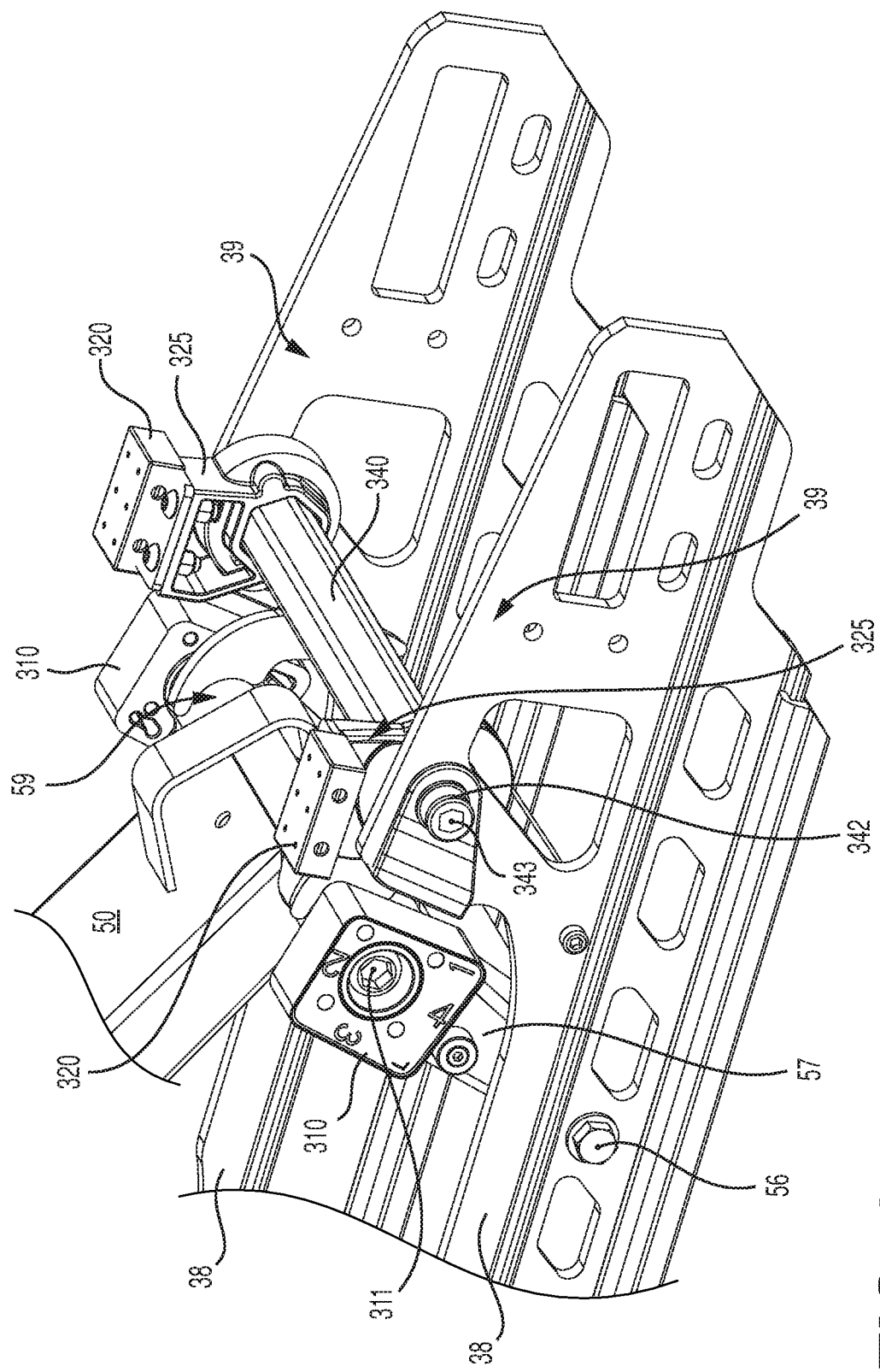
FIG. 8 is the close-up, perspective view of FIG. 5, with the rear stopper in the non-coupling position.

In FIGS. 7 to 11, the rear stoppers 320 are shown in the non-coupling position, having been pivoted clockwise (as seen from the left). In this position, the coupling blocks 310 do not abut the rear stoppers 320, or anything else, and thus the rear suspension assembly 32 does not couple. The rear stoppers 320, having been pivoted out of the range of motion of the coupling blocks 310, cannot engage with the coupling blocks 310 as the rear suspension arm 50 extends rearward and motion of the coupling blocks 310 are unimpeded by the rear stoppers 320. The maximum clockwise motion of the rocker arms 57 and the coupling blocks 310 is illustrated in FIG. 8, where it can be seen that the rear stoppers 320 do not abut the coupling blocks 310, the rocker arms 57, or the rear suspensions arm 50, and no coupling has occurred.

With reference to FIGS. 3 to 8, the coupling blocks 310, the rear stoppers 320, and their associated components will now be described in more detail. The coupling blocks 310 include a left coupling block 310 and a right coupling block 310, each attached to corresponding ends of the cross-member 59 (see FIG. 3). The coupling blocks 310 are made of an elastomer, such as rubber, polyurethane resin, delrin or nylon. It is contemplated that the coupling blocks 310 could alternatively be made of metal, such as aluminum. It is contemplated that the coupling blocks 310 could be connected directly to the rocker arms 57. It is also contemplated that the coupling blocks 310 could be connected directly to the rear suspension arm 50.

The left and right coupling blocks 310 are asymmetrical, with a rotation point 311 eccentrically placed such that the distances from the rotation point 311 to each of four sides are all different. This allows the user to vary the range of uncoupled motion (and hence the amount of inclination of the slide rails 38) by rotating the coupling blocks 310. The user rotates the coupling blocks 310 manually, but it is contemplated that other mechanisms could be employed for adjusting the coupling blocks 310.

When oriented with the side labeled "1" on the rear-most side (as shown in Figures), there is a 5.08 cm (2 inch) gap between the coupling blocks 310 and the rear stoppers 320 when the rear suspension assembly 32 is at rest. When oriented instead with the side labeled "4" on the rear-most side, there is a 0.635 cm (¼ inch) gap between the coupling blocks 310 and the rear stoppers 320 when the rear suspension assembly 32 is at rest. For situations where the user would prefer the rear suspension assembly 32 to couple faster, such as for trail riding, the user would turn the coupling blocks 310 such that side "4" is on the rear most side. For situations where the user would prefer relatively little coupling of the rear suspension assembly 32, such as for mountainous terrain, the user would turn the coupling blocks 310 such that side "1" is on the rear most side. The coupling settings "2" and "3" have separations between 5.08 cm and 0.635 cm, as they are the intermediate settings to the two examples above. Although illustrated with four sides and four coupling settings, it is contemplated that the coupling blocks 310 could have more or less than four sides and settings. In some implementations, the couple blocks 310 could have more sides than settings, for example blocks 310 with four sides which are symmetrical about a longer axis and a shorter axis would have two settings. It is also contemplated that the four settings of the coupling blocks 310 could be different than those in this implementation.

The rear stoppers 320 include a left rear stopper 320 and a right rear stopper 320 connected to the slide rails 38. Each of the left and right rear stoppers 320 is connected to a mounting portion 325. The right and left mounting portions 325 are connected to a hollow shaft 340 which extends between the slide rails 38. The shaft 340 is rotatably connected to an inner axle 344. The inner axle 344 is connected to the corresponding slide rail 38 by bolts 342. The shaft 340 rotates about a rotation axis 343 (the mechanism responsible for the rotation will be described below). It is contemplated that fasteners other than bolts could be used to connect the shaft 340 and the axle 344 to the slide rails 38. It is also contemplated that the rear stoppers 320 could be integral with the mounting portions 325. It is further contemplated that the rear stoppers 320 and/or the mounting portions 325 could be integral with the shaft 340.

In order to attenuate the impact loads generated when the coupling blocks 310 collide with their corresponding rear stoppers 320, the rear stoppers 320 are made of or coated with a resilient material such as rubber or a polymer. Such a resilient material used on the rear stoppers 320 also helps to reduce wear of the coupling blocks 310. It is contemplated that the rear suspension assembly 32 could include one or more front stoppers disposed forwardly from each of the rocker arms 57 to limit the pivot movement of the arms 57 in the counter-clockwise direction (as seen from the left). As can be seen by comparing FIGS. 5 and 6, the coupling blocks 310 travel along an arcuate path defined by the distance from the pivot point 56 to the rotation point 311 of the coupling block 310. Consequently, the rear stoppers 320 are angled so as to engage the coupling blocks 310 in a flat manner.

While operating the snowmobile 10, conditions can change and it may become desirable to allow the user to set the rear suspension assembly 32 to couple, even though the user did not want the assembly 32 to couple upon setting out. Similarly, the user may realize that they no longer want the coupling to occur during their ride. The snowmobile 10 includes an adjustment assembly 300, shown in isolation in FIG. 9, to allow the user of the snowmobile 10 to rotate the rear stoppers 320 between the coupling position and the non-coupling position without stopping or dismounting the snowmobile 10.

Figure 9:
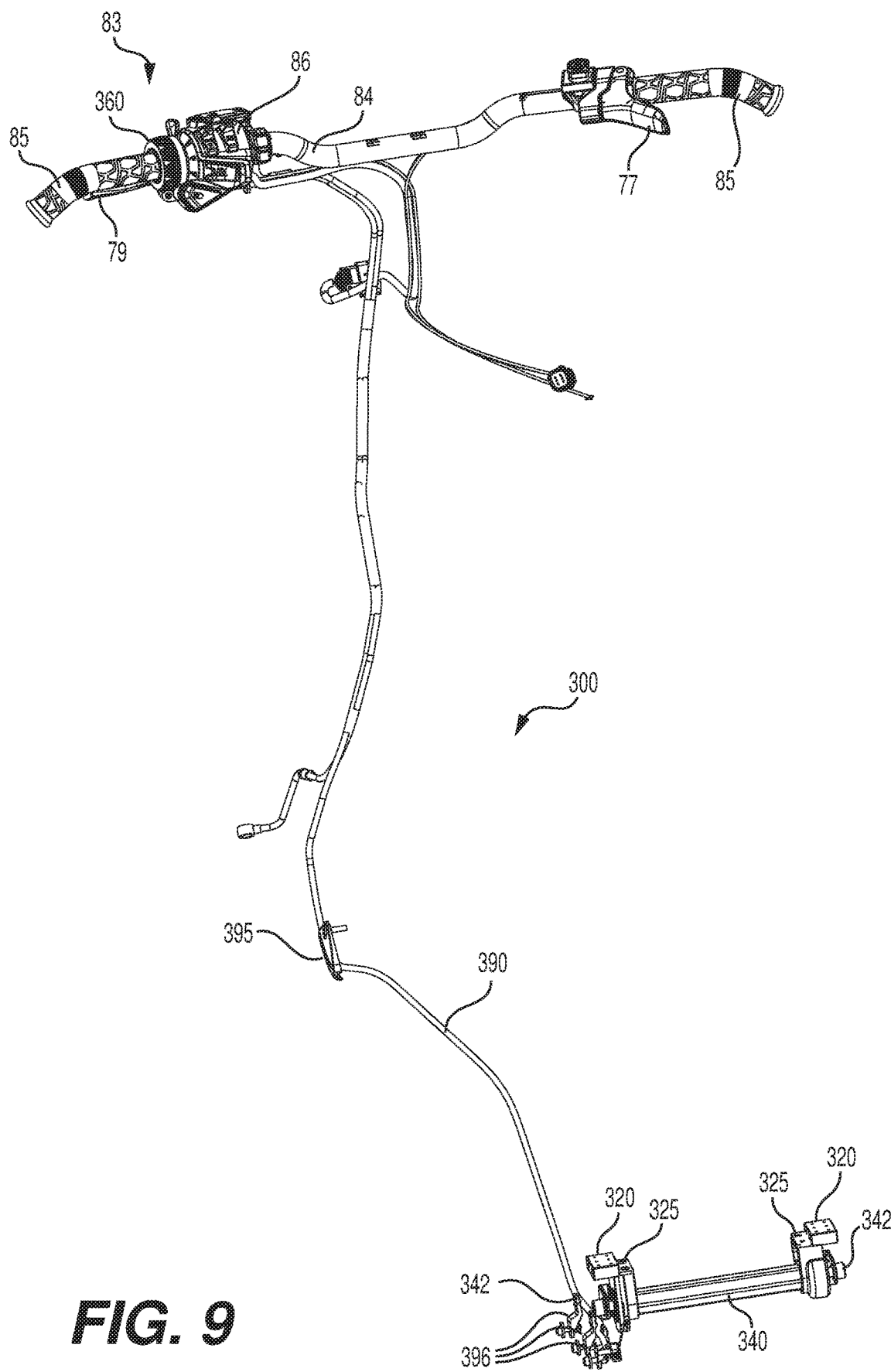
FIG. 9 is a rear, left perspective view of an adjustment assembly of the snowmobile of FIG. 1, shown in isolation.
Figure 14:
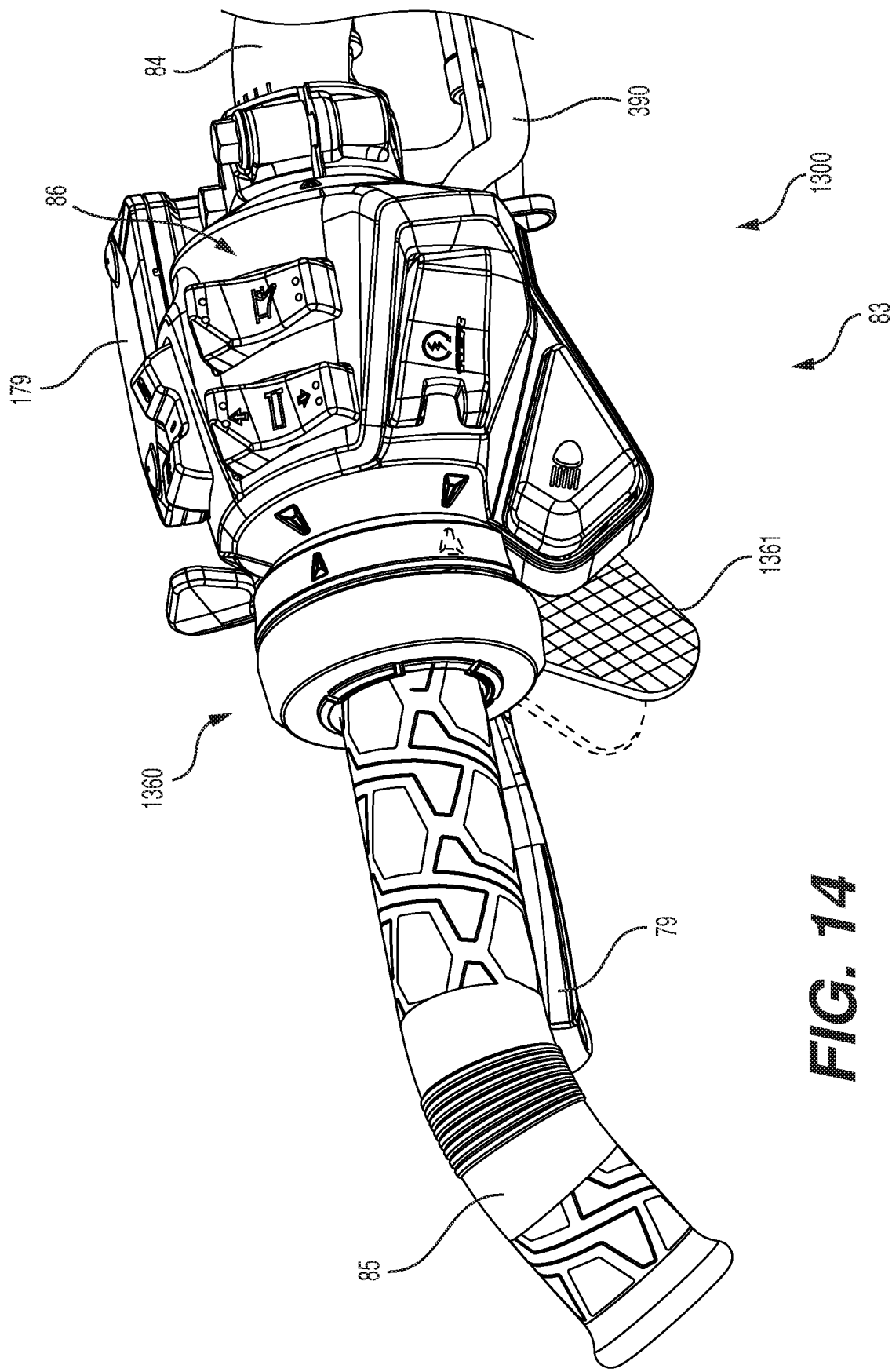
FIG. 14 is a close-up, left, rear, perspective view of a left-side portion of a handlebar of a snowmobile according to another implementation of the present technology.
Figure 15:
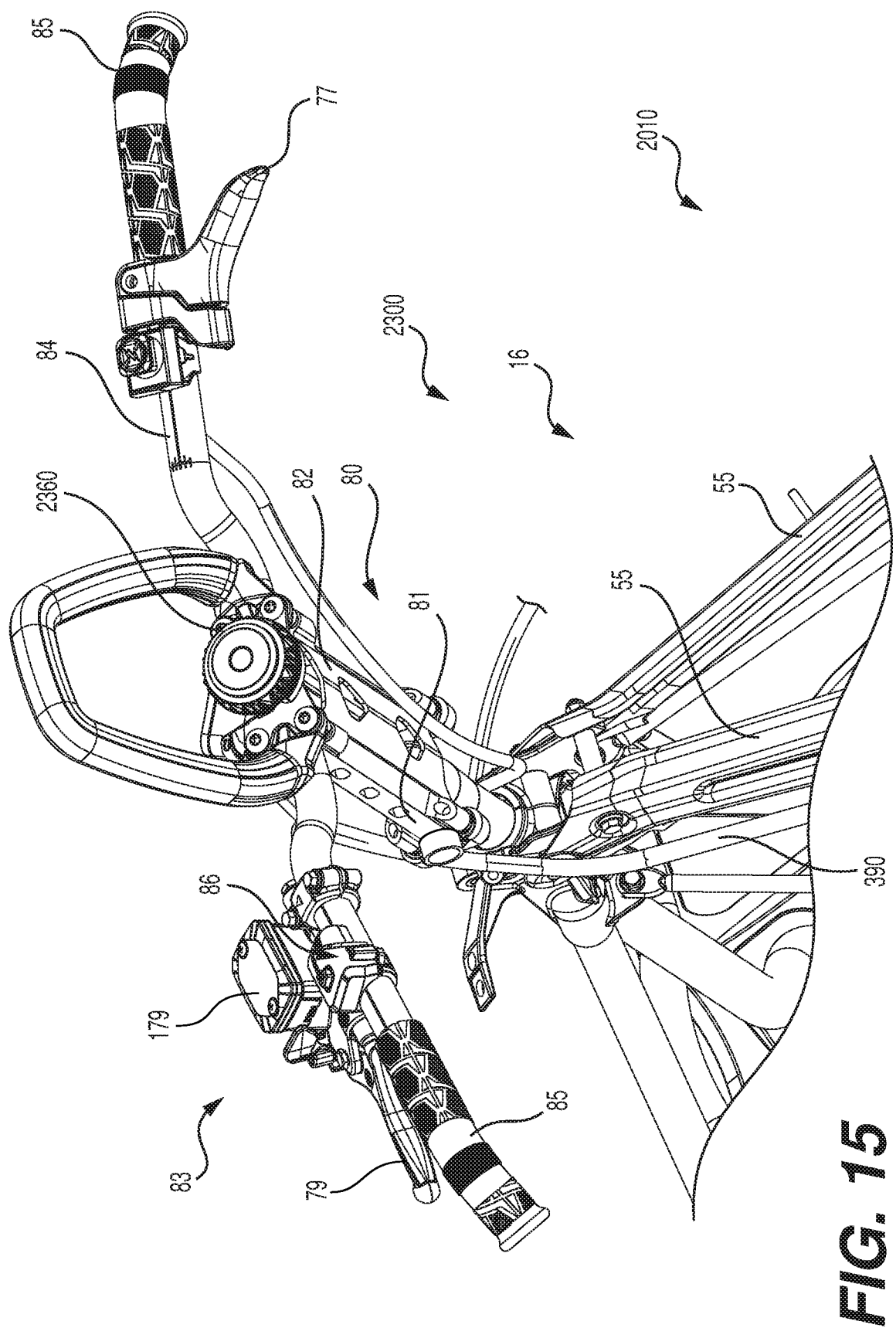
FIG. 15 is a close-up, rear, left side perspective view of a steering column and handlebar of a snowmobile according to yet another implementation of the present technology.
Figure 16:
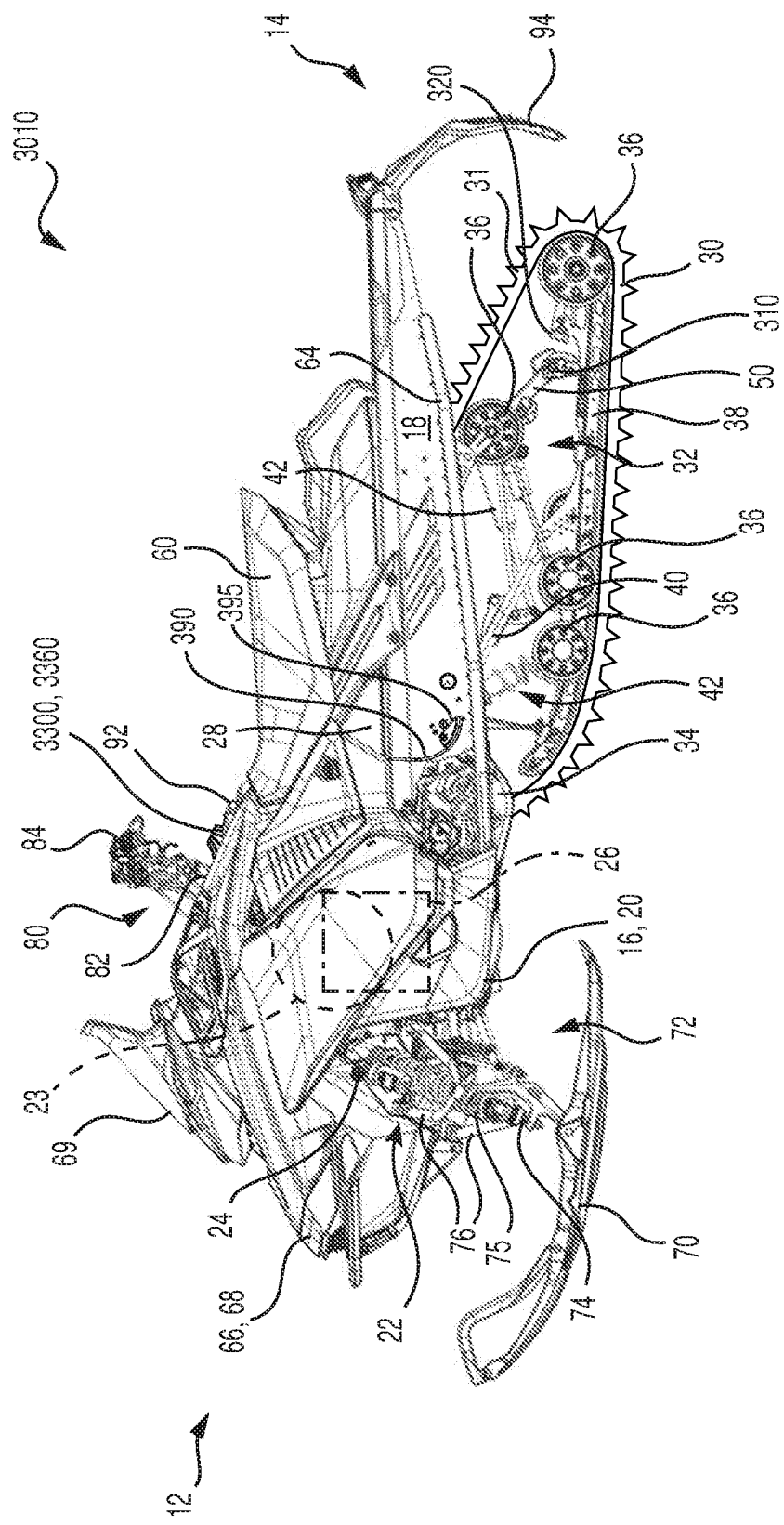
FIG. 16 is a left side elevation view of a snowmobile according to yet another implementation of the present technology.

The adjustment assembly 300 includes an actuator 360 connected, via a control cable 390, to the rear stoppers 320. In the present implementation, the actuator 360 is a twist grip actuator 360. The twist grip actuator 360, being disposed forward of the seat 60, is accessible to the user while operating the snowmobile 10. This allows the user to rotate the rear stoppers 320 without stopping and/or dismounting the snowmobile 10. As can be seen in FIG. 9, the twist grip actuator 360 is disposed on a left side portion 83 of the handlebar 84. The twist grip actuator 360 is located between the left handle 85 and a left end of a switch housing 86. The twist grip actuator 360 is located such that the user can turn the actuator 360 with their left hand, specifically within 5 cm of a right end of the left handle 85. It is contemplated that the twist grip actuator 360 could be located such that the user could turn the actuator 360 with their right hand, including having the actuator 360 disposed on a right side portion of the handlebar 84, between the right handle 85 and a left end portion of the throttle lever 77. The location of the twist grip actuator 360 is further not limited to the handlebar 84. FIGS. 15 and 16 illustrate implementations of different locations of actuators (still usable by the user during operation of the snowmobile 10), as will be described below. It is also contemplated that the actuator 360 could be one of several different actuator mechanisms, including but not limited to: a push-button, a twist knob on the handlebar 84, a switch, and a toggle switch. FIG. 14 illustrates an implementation using an actuator 1360 using a lever 1361 to rotate the rear stoppers 320 and will be described below.

Figure 12:
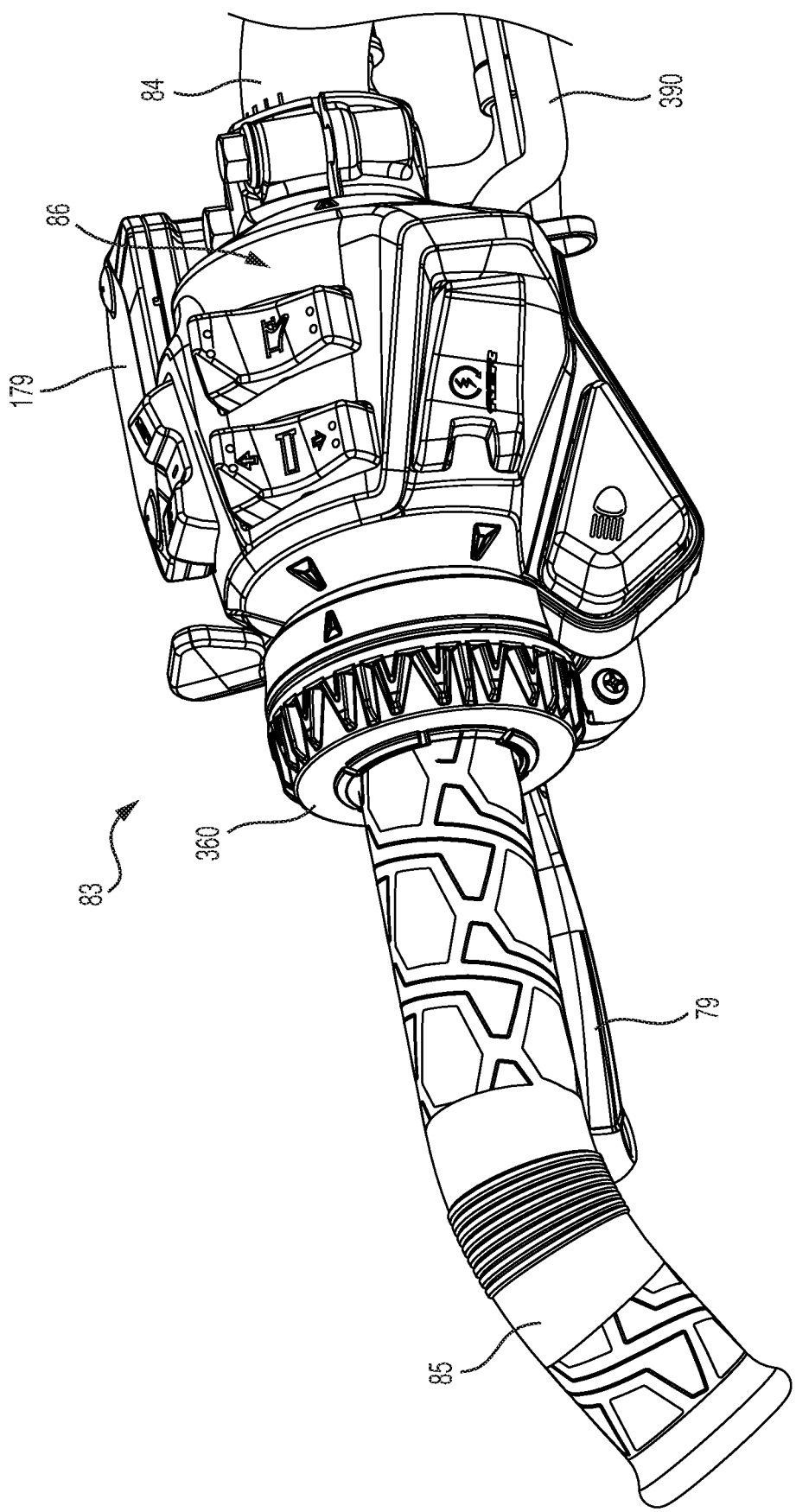
FIG. 12 is a close-up, left, rear perspective view of a left-side portion of a handlebar of the snowmobile of FIG. 1, showing a twist grip actuator of the adjustment assembly of FIG. 9 in a top position.
Figure 13:
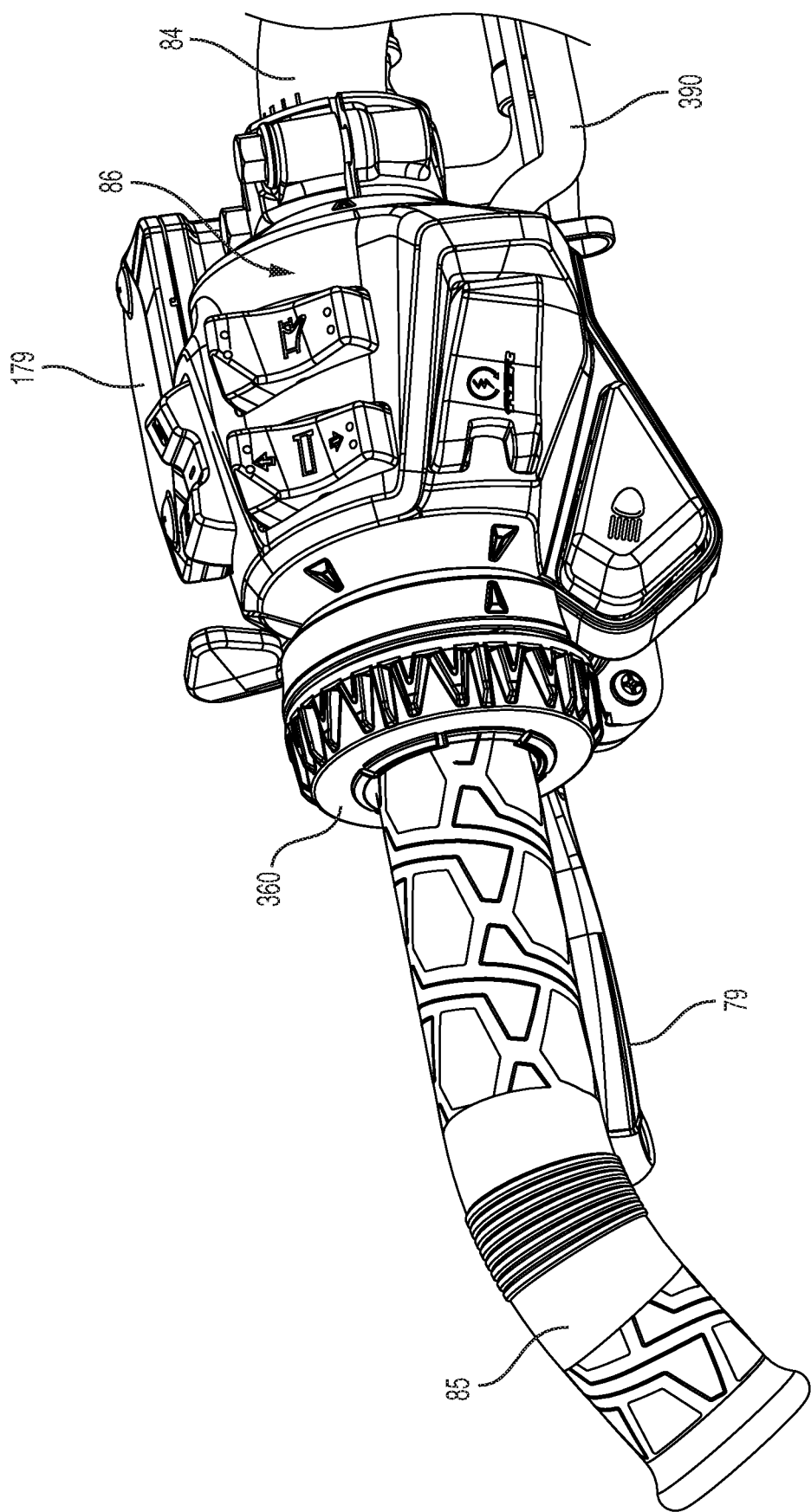
FIG. 13 is the close-up, left, rear, perspective view of FIG. 12, showing the twist grip in a bottom position.

The twist grip actuator 360 rotates between a top position (see FIG. 12) and a bottom position (FIG. 13). The top and bottom positions correspond to two different arrangements of the rear stoppers 320 (described below).

The twist grip actuator 360 connects to a front end of the control cable 390. As can be seen in FIG. 2, the control cable 390 runs from the actuator 360, along the handlebar 84, down the steering column 82 along a handlebar riser 71, along one of the frame members 55, and along an exterior side of a side wall 18a of the tunnel 18. As the control cable 390 runs along the frame member 55, the cable 390 is in an interior of the body panels 66 from the steering column 82 until it reaches the tunnel side wall 18a. This can be seen in FIG. 1, where the control cable 390 is hidden from view (inside the body panels 66) from the steering column 82 to the tunnel 18. After passing through the tunnel 18, the cable 390 runs along the front suspension arm 40, down to the left slide rail 28. It is contemplated that the control cable 390 could follow a different path through the snowmobile 10, depending on the specific implementation.

Figure 10:
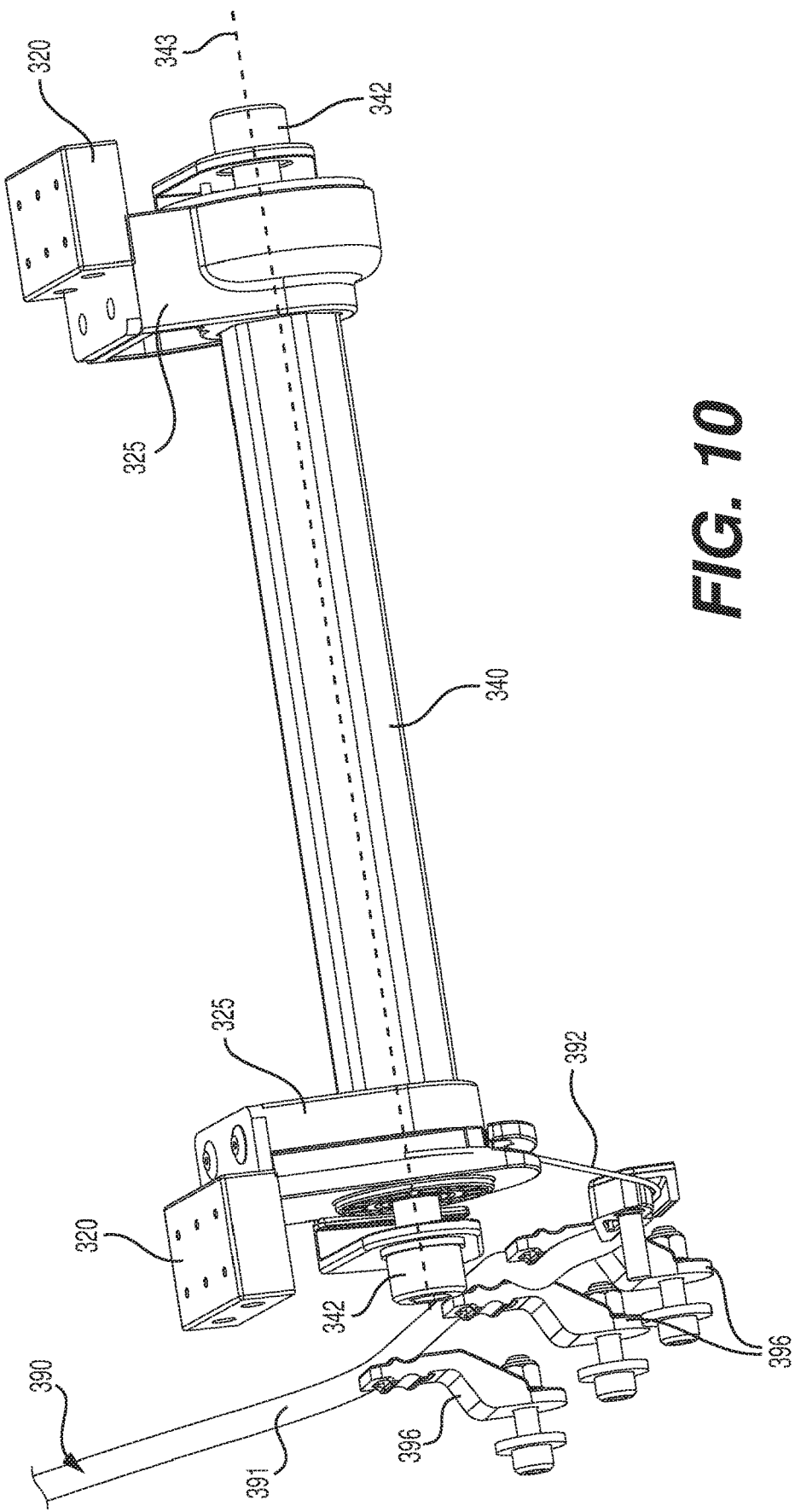
FIG. 10 is a close-up, rear, left perspective view of portions of the adjustment assembly of FIG. 9.

The control cable 390 is a steel cable 392 within a plastic sleeve 391 (see FIG. 10). It is contemplated that the cable 392 could be made of a different materials, including but not limited to: wrought iron, para-aramid fiber, and carbon fiber. It also contemplated that the sleeve 391 could be made of a different material, or be differently shaped, provided it protects the cable 392 while allowing the cable 392 to move within the sleeve 391. Different implementations of material of the sleeve 391 could include, but are not limited to, metal, ceramic, and resin. The control cable 390 is held to the exterior of the side wall 18a by a brace 395. The control cable 390 is further held to an interior side of the left slide rail 38 by three additional braces 396 (see FIGS. 9 and 10). It is contemplated that the control cable 390 could be fixed by more or less braces 395, 396. It is also contemplated that the control cable 390 could be held in place on the snowmobile 10 by various other or additional means, including, but not limited to, fasteners, hooks, and cable loops.

Figure 11:
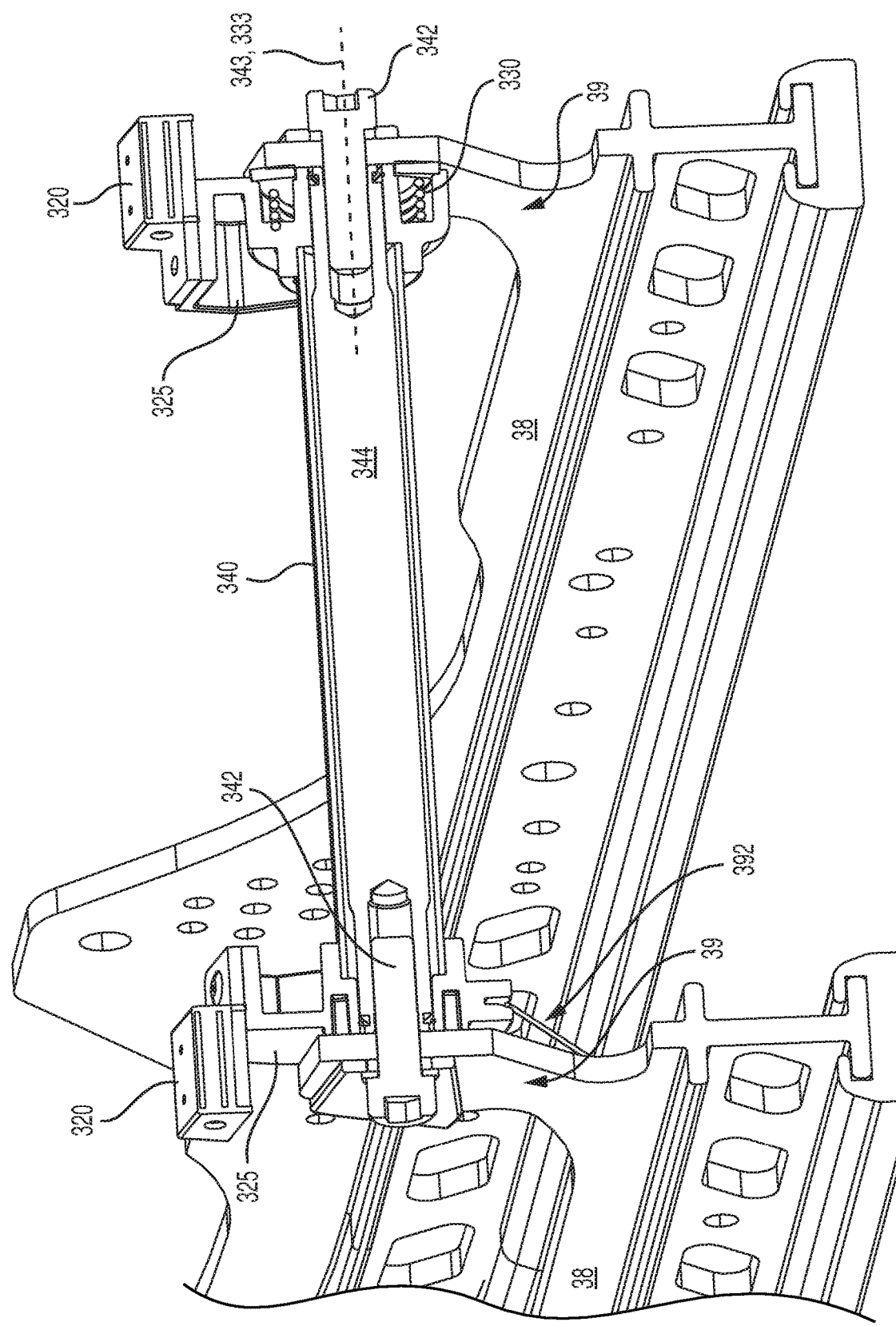
FIG. 11 is a rear, left, cross-sectional, perspective view of the rear suspension system assembly of FIG. 7, taken along line 11-11 of FIG. 7.

As can be seen in FIGS. 10 and 11, the cable 392 connects at its rear end the left mounting portion 325. The cable 392 is fixed partially around a rear side of the left mounting portion 325, such that when the cable 392 is pulled in a forward direction, for example by inducing tension on the cable 392, the left mounting portion 325 is caused to turn in a clockwise direction (as seen from the left). It is contemplated that the cable 392 could be connected to the right mounting portion 325. It is also contemplated that the cable 392 could be connected to the shaft 340 directly in some implementations.

Within the right mounting portion 325, there is disposed a biasing member 330. In the present implementation, the biasing member 330 is a torsion spring 330 that rotates about a torsion axis 333. The torsion axis 333 is aligned with the rotation axis 343 of the hollow shaft 340. It is contemplated that the biasing member 330 could be implemented as a different mechanism, including, but not limited to, a biased hinge and a cantilever spring. It is also contemplated that the biasing member 330 could be disposed in the left mounting portion 325 in some implementations. The biasing member 330 is included in the adjustment system 300 for adjusting a position of the rear stoppers 320, described below. One end of the torsion spring 330 is connected to the right mounting portion 325, while the other end of the torsion spring 330 is connected to the raised portion 39. The torsion spring 330 biases the right mounting portion 325, the connected shaft 340 and rear stoppers 320, toward the coupling position. When the shaft 340 rotates toward a non-coupling position, the end of the spring 330 connected to the right mounting portion 325 compresses and loads the torsion spring 330.

The cooperation of the components of the adjustment system 300 will now be described in reference to FIGS. 4 to 13. As mentioned above, the coupling blocks 310 and the rear stoppers 320 act to couple movement of the shock absorbers 42, 45 which only occurs if the rear stoppers 320 are in the coupling position. When the rear stoppers 320 are in the non-coupling position, no coupling of the movement of the shock absorbers 42, 45 can occur.

The user of the snowmobile 10 controls the configuration of the rear stoppers 320 via the twist grip actuator 360. As can be seen in FIGS. 12 and 13, the twist grip actuator 360 is rotated between two positions: the top position (FIG. 12) and the bottom position (FIG. 13), which correspond to the two different positions of the rear stoppers 320. When the actuator 360 is moved from one position to the other, the rear stoppers 320 will move to the corresponding position.

The top position of the twist grip actuator 360 (FIG. 12) corresponds to the coupling position of the rear stoppers 320 (FIGS. 3 to 6). In this position of the rear stoppers 320, the rear stoppers 320 are each disposed generally forward of the corresponding raised portions 39 of the slide rails 38. The bottom position of the twist grip actuator 360 (FIG. 13) corresponds to the non-coupling position of the rear stoppers 320 (FIGS. 7 to 11). In this position of the rear stoppers 320, the rear stoppers 320 are each disposed generally above of the corresponding raised portions 39 of the slide rails 38. In this case, the coupling blocks 310 cannot make contact with the rear stoppers 320 and no coupling of the rear suspension assembly 32 can occur, as mentioned above.

When the user rotates the twist grip actuator 360 from the top position to the bottom position (clockwise as seen from the left), the twist grip actuator 360 pulls the cable 392, causing an increase in tension. The increased tension on the cable 392 in turn rotates the left mounting portion 325 clockwise (as seen from the left). The hollow shaft 340, the right mounting portion 325, and the rear stoppers 320, all being rigidly connected directly or indirectly to the left mounting portion 325, also turn clockwise to the non-coupling position. Rotation of the right mounting portion 325 also causes the end of the torsion spring 330 connected thereto to rotate clockwise. As the other end of the torsion spring 330 is fixed to the raised portion 39, rotation of the right mounting portion 325 compresses and loads the torsion spring 330.

When the user turns the twist grip actuator 360 from the bottom position to the top position (counter-clockwise as seen from the left), the actuator 360 lets out the cable 392 to reduce its tension. The decreased tension on the cable 392 allows the torsion spring 330, having been compressed by rotation of the right mounting portion 325 from the coupling position to the non-coupling position, to extend and turn the right mounting portion 325 back to the coupling position, along with the shaft 340, the left mounting portion 325, and the rear stoppers 320.

Another implementation of an adjustment system 1300 including the actuator 1360 is illustrated in FIG. 14. The actuator 1360 is disposed on the left-side portion 83 of the handlebar 84, between the handle 85 and the brake fluid reservoir 179 and uses a lever 1361. The lever actuator 1360 alternates between a top actuator position (FIG. 14) and a bottom actuator position (in dashed lines in FIG. 14) when the user pushes the lever 1361 with one of their fingers. The user could equally pull the lever 1361 to alternate between the top and bottom actuator positions. As with the twist grip actuator 360, the lever actuator 1360 either increases or decreases tension on the control cable 390 in order to adjust the position of the rear stoppers 320. Remaining portions of the system 1300 are identical to the system 300 described above and as such need not be repeated here.

Another implementation of an adjustment system 2300 including an actuator 2360 is illustrated in FIG. 15. In this implementation, the actuator 2360 is a dial knob 2360 disposed on a top of the handlebar riser 81 connecting the handlebar 84 to the chassis 16. To alternate between the two different positions of the rear stoppers 320 in this implementation, the user rotates the knob 2360 with either their left or right hand, the knob 2360 still being accessible to the user while operating the snowmobile 2010. Upon rotating the knob 2360, the knob 2360 increases or decreases the tension on the control cable 390, depending on the direction of rotation as described with respect to the adjustment system 300. Remaining portions of the system 2300 are identical to the system 300 described above and as such need not be repeated here. Remaining portions of the snowmobile 2010 are identical to the snowmobile 10, other than replacement of the system 300 with the system 2300, and as such need not be repeated here.

Yet another implementation of an adjustment system 3300 on a snowmobile 3010, including an actuator 3360, is illustrated in FIG. 16. In this implementation, the actuator 3360 is a dial knob 3360 disposed on one of the body panels 66, forward of the seat 60. The knob 3360 is connected to the control cable 390 in order to adjust the position of the rear stoppers 320 as described with respect to the knob 3360. Remaining portions of the system 3300 are identical to the system 300 described above and as such need not be repeated here. Remaining portions of the snowmobile 3010 are identical to the snowmobile 10, other than replacement of the system 300 with the system 3300, and as such need not be repeated here.

Figure 17:
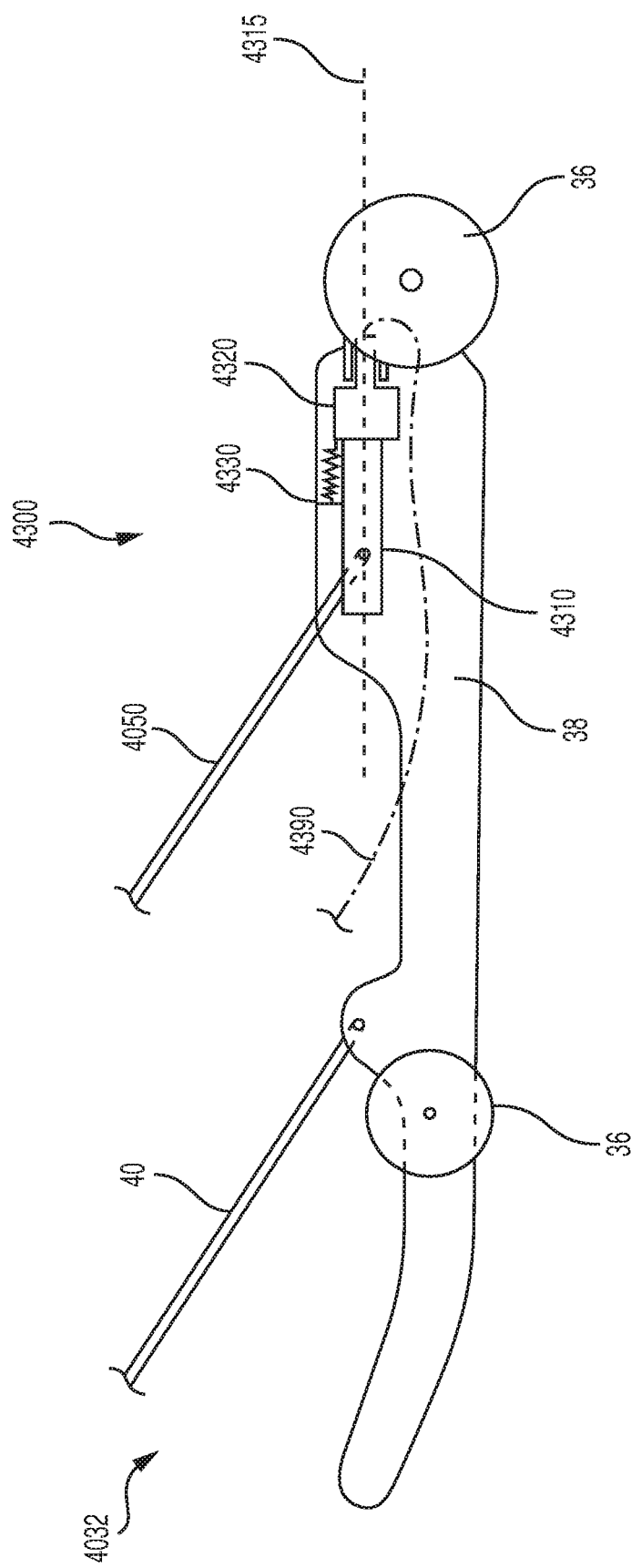
FIG. 17 is a left side elevation view of a suspension assembly for a snowmobile according to yet another implementation of the present technology.
Figure 18:
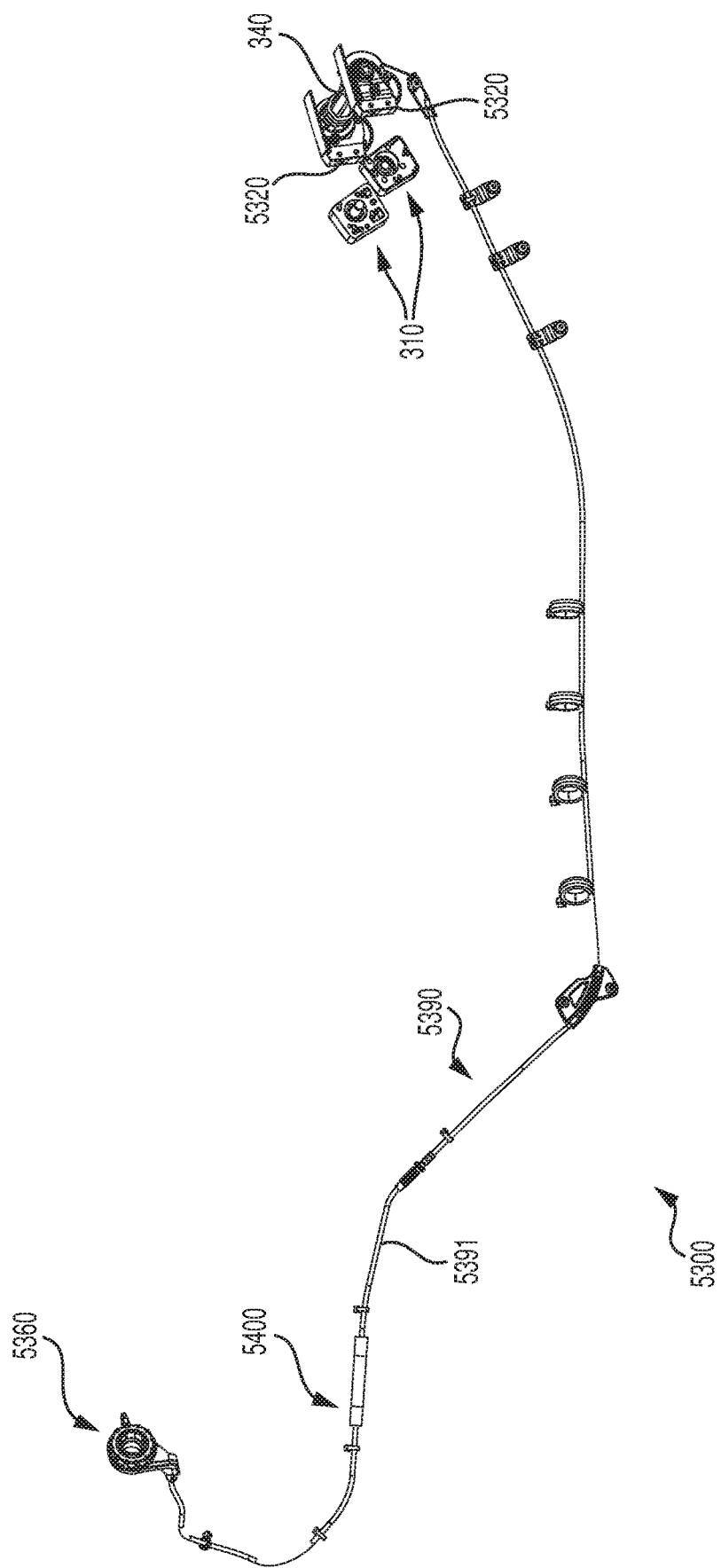
FIG. 18 is a front, left side perspective view of an adjustment assembly according to yet another implementation of the present technology.

Another implementation of a rear suspension assembly 4032 according to the present technology is shown schematically in FIG. 17. In this implementation, there are no rocker arms included and the two rear suspension arms 4050 (only the left arm 4050 being shown) are slidably connected to their corresponding slide rails 38. More details for similar rear suspension assemblies are provided in U.S. Pat. No. 5,265,692, published Nov. 30, 1993, the entirety of which is incorporated herein by reference.

As illustrated in FIG. 17, coupling blocks 4310 (only the left block 4310 being shown, the right block 4310 being the same) slide along an axis 4315 in the slide rails 38. Two rear stoppers 4320 are disposed in the slide rails 38, also along the axis 4315. In this implementation, the rear stoppers 4320 translate, rather than rotate, between their coupling and non-coupling positions. The adjustment assembly 4300 includes a control cable 4390 (illustrated as a dash-dot line) and biasing elements 4330, shown schematically as linear springs 4330. As with the adjustment assembly 300, tension applied to the control cable 4390 pulls the rear stoppers 4320 into the non-coupling position. When tension is released from the cable 4390, the biasing elements 4330 bias the rear stoppers 4320 back to the coupling position. Remaining portions of the system 4300 are identical to the system 300 described above and as such need not be repeated here.

Another implementation of an adjustment system 5300 including an actuator 5360 is illustrated in FIGS. 18 to 22. The actuator 5360 is disposed on the left-side portion 83 of the handlebar 84, as was the case for the actuator 360. The actuator 5360 uses a lever 5361. The lever actuator 5360 alternates between a top actuator position (FIG. 20) and a bottom actuator position (shown in dashed lines in FIG. 20) when the user pushes or pulls the lever 5361 with one of their fingers. The user could equally pull the lever 5361 to alternate between the top and bottom actuator positions. As with the twist grip actuator 360, the lever actuator 5360 either increases or decreases tension on the control cable 5390 in order to adjust the position of rear stoppers 5320.

The adjustment system 5300 further includes left and right rear stoppers 5320. The rear stoppers 5320 each include a snow-flap 5327 for aiding in protecting the rear stoppers 5320 from snow or ice build-up. When the rear stoppers 5320 are in the coupling position, the snow-flaps 5327 extend generally rearward from the rear stoppers 5320 and over a top of the mounting portions 325. When the rear stoppers 5320 are in the non-coupling position, the snow-flaps 5327 extend generally downward from the rear stoppers 5320, rearward of the mounting portions 325. Remaining portions of the rear stoppers 5320 are identical to the rear stoppers 320 described above and as such need not be repeated here.

The adjustment system 5300 further includes a control cable 5390. As with the control cable 390, the control cable 5390 includes the steel cable 392, as well as a sheath 5391 disposed therearound. In this implementation, the control cable 5390 further includes a control cable compensator assembly 5400, described in more detail below.

When the user rotates the lever actuator 5360, the rear stoppers 5320 change positions as described above with respect to stoppers 320. In some situations, however, it may not be possible for the rear stoppers 5320 to change position. The compensator assembly 5400 is included on the control cable 5390 to aid in preventing any portion of the adjustment system 5300 from breaking if the lever actuator 5360 is rotated but the rear stoppers 5320 cannot rotate.

Figure 19:
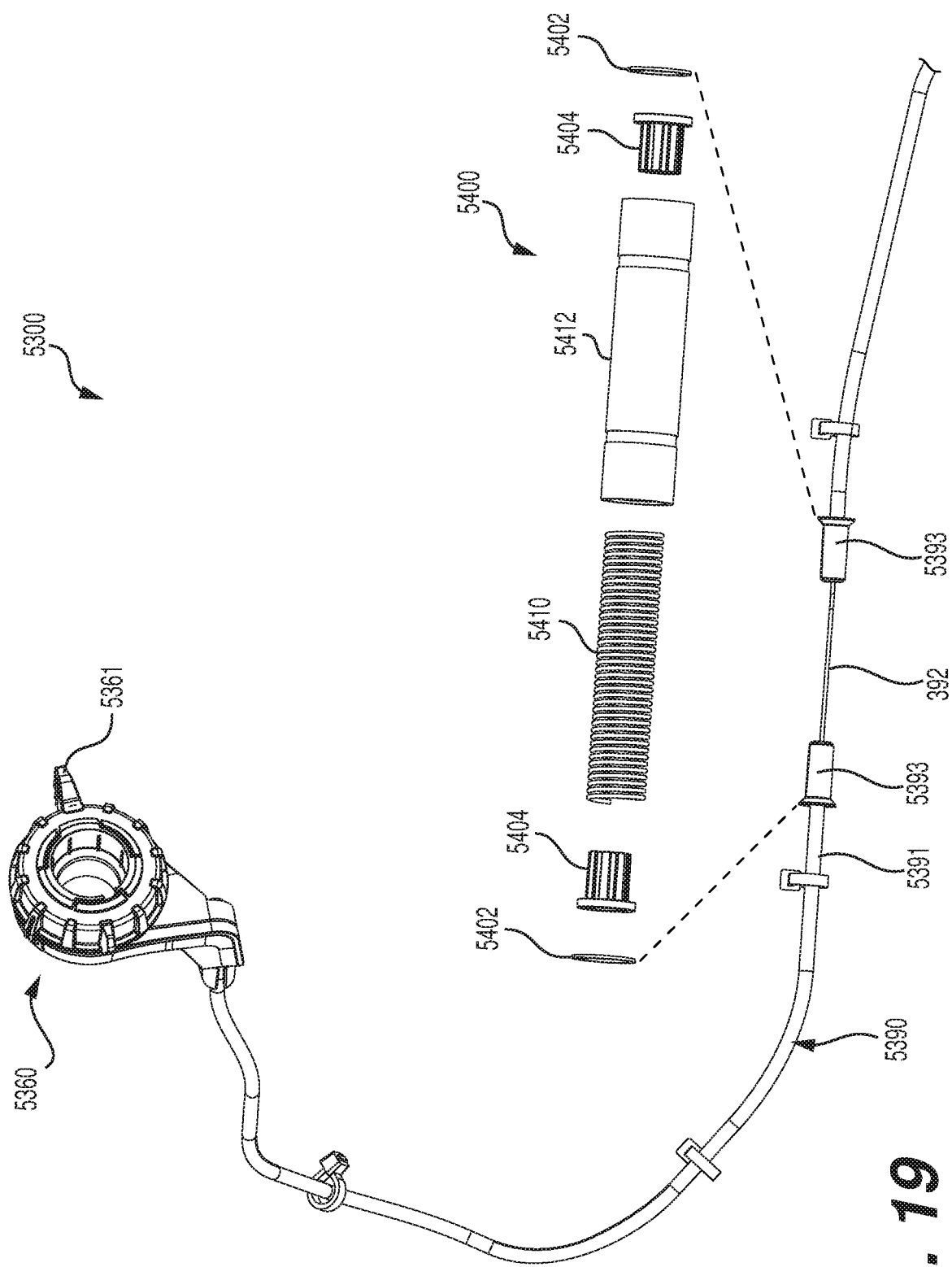
FIG. 19 is a close-up view of a forward portion of the adjustment assembly of FIG. 18.
Figure 20:
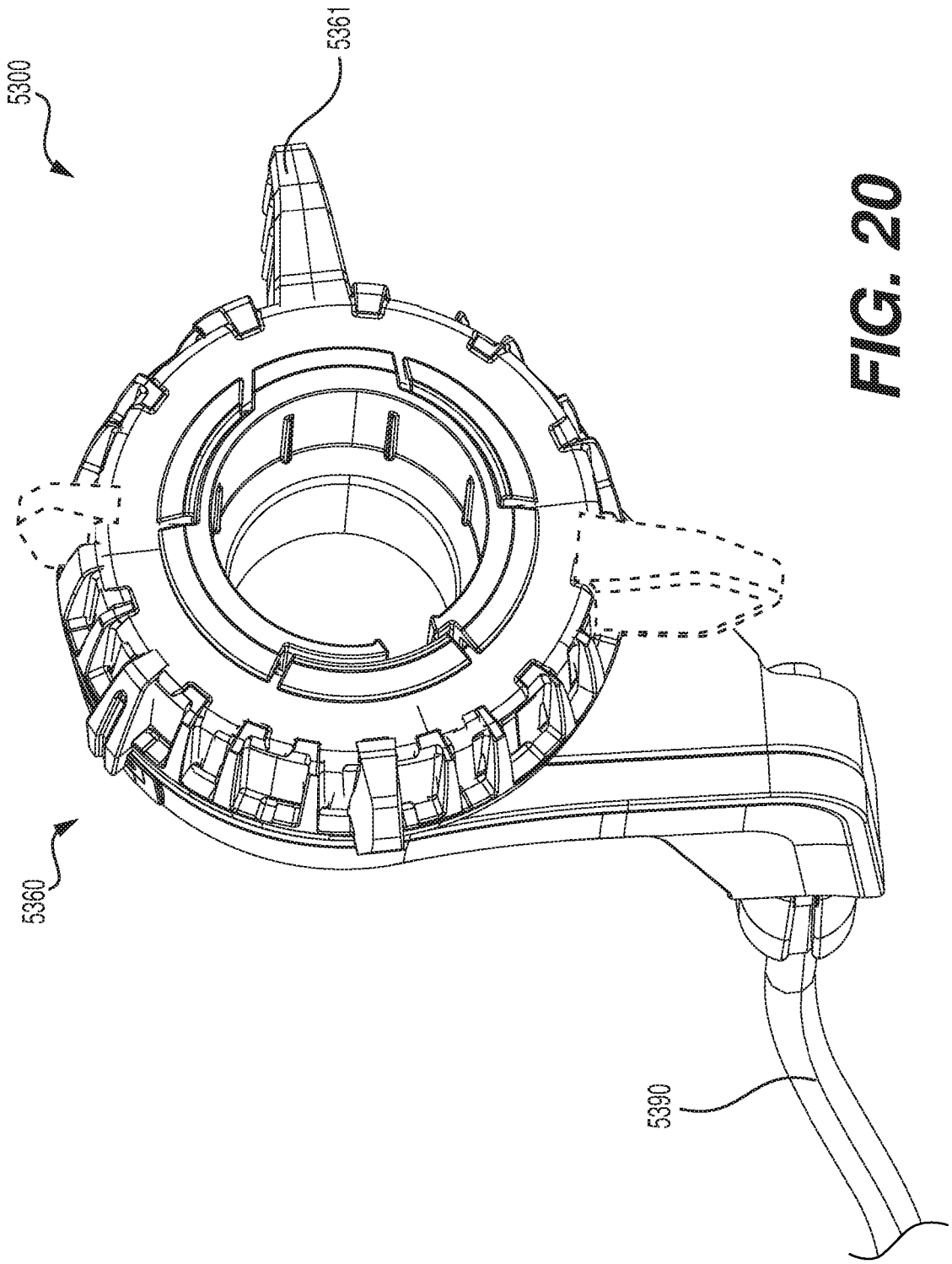
FIG. 20 is a close-up view of an actuator of the adjustment assembly of FIG. 18.
Figure 21:
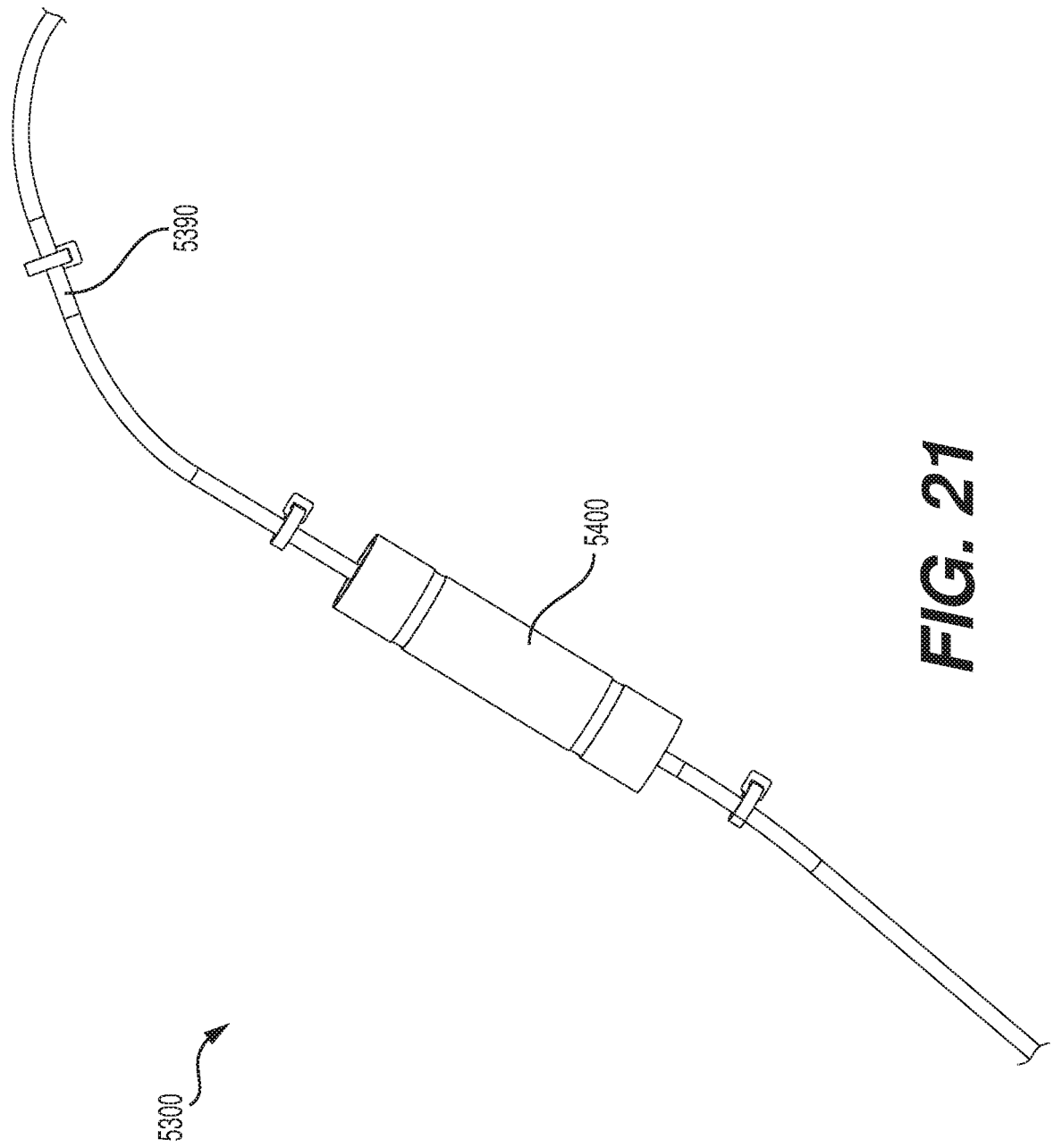
FIG. 21 is a close-up view of a control cable compensator of the adjustment assembly of FIG. 18.
Figure 22:
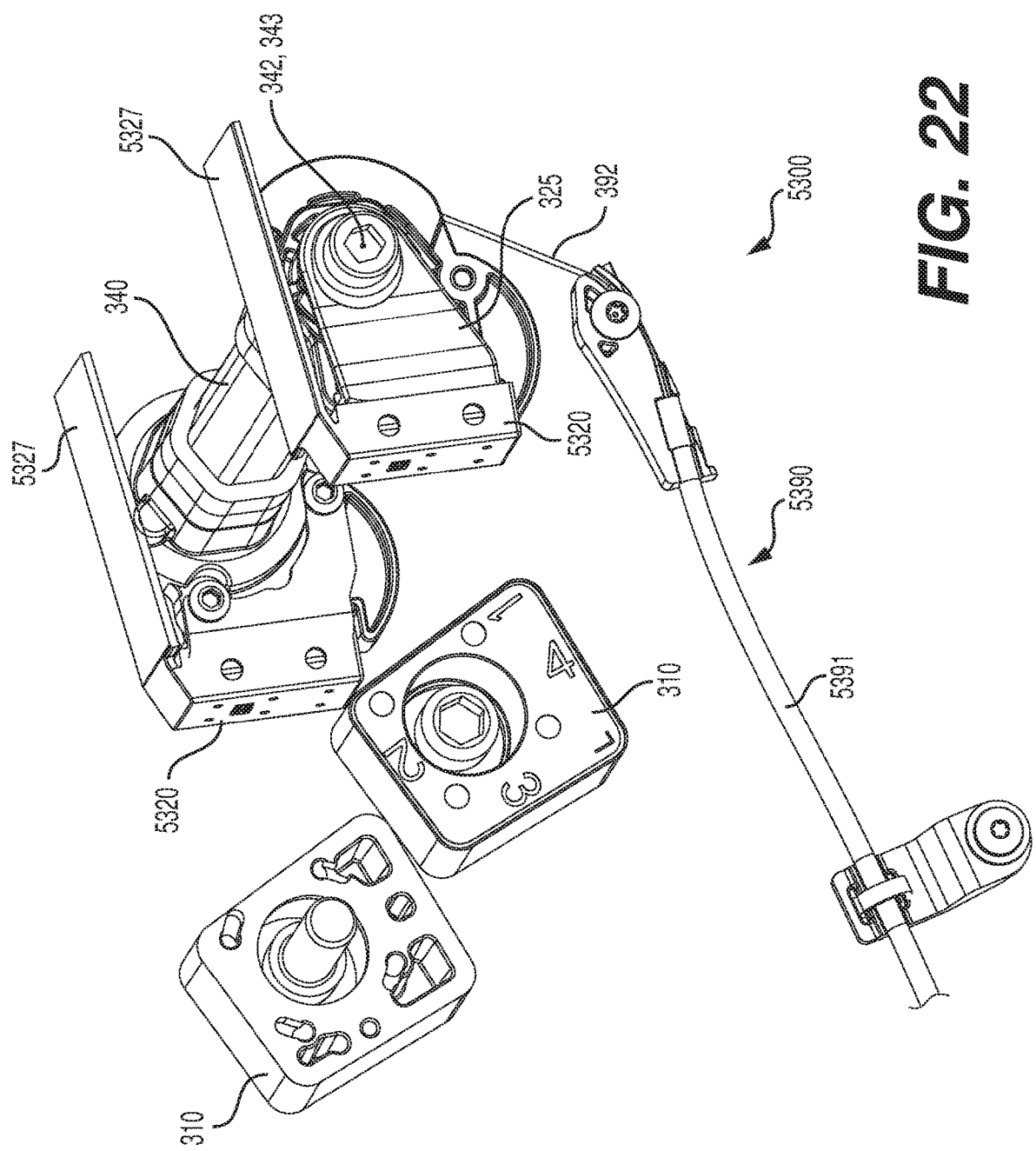
FIG. 22 is a close-up view of a rear portion of the adjustment assembly of FIG. 18 and coupling blocks of the snowmobile of FIG. 1.

Components of the compensator assembly 5400 will now be described in more detail, with reference to FIG. 19. The compensator assembly 5400 is disposed around the steel cable 392 and is connected between the forward portion of the sheath 5391 and the rearward portion of the sheath 5391. Specifically, the compensator assembly 5400 connects between a forward cap 5393 extending from the forward portion of the sheath 5391 and a rearward cap 5393 extending from the rearward portion of the sheath 5391.

The compensator assembly 5400 includes two rigid members 5404, each of which are disposed on a corresponding one of the caps 5393. A resilient member 5410, specifically a spring 5410, is disposed around and extends between the two rigid members 5404. It is contemplated that the resilient member 5410 could be implemented differently. The steel cable 392 extends through the compensator assembly 5400, but is not connected thereto, such that the steel cable 392 may move freely with respect to the compensator assembly 5400.

When the actuator 5360 is rotated, but the rear stoppers 5320 cannot rotate, the tension created in the steel cable 392 will bias the steel cable 392 and sheath 5391 to straighten along its path between the actuator 5360 and the rear stoppers 5320, which under normal circumstances, the rigid sheath 5391 prevents from happening. The forward cap 5393 and the rearward cap 5393 of the sheath 5391 will be pushed toward each other, compressing the spring 5410. This generally allows the steel cable 392 and the sheath 5391 to slightly straighten between the actuator 5360 and the rear stoppers 5320 thus shortening the sheath length 5391, preventing any portion of the adjustment system 5300 from breaking. It should be noted that the spring 5410 is chosen to have a spring constant such that the spring 5410 will deform before tension can cause the steel cable 392 to break, while also being sufficiently rigid to resist compression at tensions necessary to rotate the rear stoppers 5320 when the rear stoppers 5320 are free to move.

Finally, compensator assembly 5400 includes a cover 5412, to protect the resilient member 5410, for aesthetic purposes, and to generally impede the resilient member 5410 from bending rather than compressing. The cover 5412 is disposed around the resilient member 5410 and the rigid members 5404. Two retaining rings 5402 are disposed within grooves on the inner diameter of the cover 5412 to prevent rigid members 5404 from exiting cover 5412 under the bias of the spring 5410.

Remaining portions of the system 5300 are identical to the system 300 described above and as such need not be repeated here.

The vehicle 10, 2010, 3010 implemented in accordance with some non-limiting implementations of the present technology can be represented as presented in the following numbered clauses.

CLAUSE 1. A vehicle (10, 2010, 3010), comprising a chassis (16); at least one seat (60) connected to the chassis (16); a motor (26) connected to the chassis (16); an endless drive track (30) disposed below the chassis (16), the endless drive track (30) being operatively connected to the motor (26) for propulsion of the vehicle (10, 2010, 3010); a rear suspension assembly (32, 4032) supporting the endless drive track (30), the rear suspension assembly (32, 4032) comprising: a left slide rail (38), a right slide rail (38), at least one rear suspension arm (50, 4050) having a first end and a second end, the first end of the at least one rear suspension arm (50, 4050) being operatively pivotally connected to at least one of the left and right slide rails (38), the second end of the at least one rear suspension arm (50, 4050) being operatively pivotally connected to the chassis (16), at least one coupling block (310, 4310) connected to the at least one rear suspension arm (50, 4050), and at least one rear stopper (320, 4320, 5320) movably connected to the at least one of the left and right slide rails (38), the at least one rear stopper (320, 4320, 5320) being movable between a first stopper position and a second stopper position, the at least one rear stopper (320, 4320, 5320) being disposed within a range of motion of the at least one coupling block (310, 4310) when in the first stopper position, the at least one coupling block (310, 4310) selectively abutting the at least one rear stopper (320, 4320, 5320) when the first end of the at least one rear suspension arm (50, 4050) extends rearward, the at least one rear stopper (320, 4320, 5320) being disposed out of the range of motion of the at least one coupling block (310, 4310) when in the second stopper position, motion of the at least one coupling block (310, 4310) being unimpeded by the at least one rear stopper (320, 4320, 5320) when the first end of the at least one rear suspension arm (50, 4050) extends rearward; a control cable (390, 4390, 5390) having a first end operatively connected to the at least one rear stopper (320, 4320, 5320) of the rear suspension assembly (32, 4032); and an actuator (360, 1360, 2360, 3360, 5360) operatively connected to a second end of the control cable (390, 4390, 5390) and the at least one rear stopper (320, 4320, 5320) via the control cable (390, 4390, 5390), the actuator (360, 1360, 2360, 3360, 5360) being disposed forward of the at least one seat (60), the actuator (360, 1360, 2360, 3360, 5360) being operable by a user during operation of the vehicle (10, 2010, 3010), the actuator (360, 1360, 2360, 3360, 5360) being movable between a plurality of actuator positions including at least a first actuator position and a second actuator position, a position of the at least one rear stopper (320, 4320, 5320) being related to a selected one of the plurality of actuator positions, the at least one rear stopper (320, 4320, 5320) moving to the first stopper position when moving the actuator (360, 1360, 2360, 3360, 5360) to the first actuator position, the at least one rear stopper (320, 4320, 5320) moving to the second stopper position when moving the actuator (360, 1360, 2360, 3360, 5360) to the second actuator position.

CLAUSE 2. The vehicle (10, 2010, 3010) of clause 1, wherein the at least rear stopper (320, 4320, 5320) moves between the first stopper position and the second stopper position by rotation.

CLAUSE 3. The vehicle (10, 2010, 3010) of clause 1 or 2, further comprising at least one rocker arm (57) having a first end and a second end; and wherein the first end of the at least one rocker arm (57) is pivotally connected to at least one of the left and right slide rails (38); and the second end of the at least one rocker arm (57) is pivotally connected to the first end of the at least one rear suspension arm (50, 4050).

CLAUSE 4. The vehicle (10, 2010, 3010) of clause 3, further comprising: a cross-member (59) connected to the first end of the at least one rear suspension arm (50, 4050); wherein: the at least one rocker arm (57) includes: a right rocker arm (57) pivotally connected to the right slide rail (38) at a first end of the right rocker arm (57), and a left rocker arm (57) pivotally connected to the left slide rail (38) at a first end of the left rocker arm (57); the at least one coupling block (310, 4310) is operatively connected to one of: the right rocker arm (57), and the left rocker arm (57); a second end of the right rocker arm (57) is connected to the cross-member (59); a second end of the left rocker arm (57) is connected to the cross-member (59); and the at least one rear stopper (320, 4320, 5320) is rotatably connected to: the right slide rail (38) if the at least one coupling block (310, 4310) is connected to the right rocker arm (57), and the left slide rail (38) if the at least one coupling block (310, 4310) is connected to the left rocker arm (57).

CLAUSE 5. The vehicle (10, 2010, 3010) of clause 4, wherein the at least one coupling block (310, 4310) is connected to at least one of the first end of the cross-member (59) and the second end of the cross-member (59).

CLAUSE 6. The vehicle (10, 2010, 3010) of clause 5, wherein: the at least one coupling block (310, 4310) includes: a right coupling block (310, 4310) connected to the right rocker arm (57), and a left coupling block (310, 4310) connected to the left rocker arm (57); the at least one rear stopper (320, 4320, 5320) includes: a right rear stopper (320, 4320, 5320) connected to the right slide rail (38), and a left rear stopper (320, 4320, 5320) connected to the left slide rail (38); and further comprising: a shaft (340) connecting to and extending between the right rear stopper (320, 4320, 5320) and the left rear stopper (320, 4320, 5320), the right and left rear stoppers (320, 4320, 5320) being rotationally fixed with respect to the shaft (340), the shaft (340) being adapted for rotating the right and left rear stoppers (320, 4320, 5320) such that the right and left rear stoppers (320, 4320, 5320) are in a same one of the first and second stopper positions.

CLAUSE 7. The vehicle (10, 2010, 3010) of clause 6, further comprising: a right mounting portion (325) connected to a right end portion of the shaft (340), the right rear stopper (320, 4320, 5320) being connected to the right mounting portion (325); and a left mounting portion (325) connected to a left end portion of the shaft (340), the left rear stopper (320, 4320, 5320) being connected to the left mounting portion (325), the right and left mounting portions (325) being rotationally fixed with respect to the shaft (340).

CLAUSE 8. The vehicle (10, 2010, 3010) of clause 7, further comprising a biasing element (330, 4330) operatively connected to at least one of the right and left mounting portions (325), the biasing element (330, 4330) biasing the right and the left rear stoppers (320, 4320, 5320), via the at least one of the right and left mounting portions (325), toward the first stopper position.

CLAUSE 9. The vehicle (10, 2010, 3010) of clause 8, wherein: the control cable (390, 4390, 5390) is connected to an other one of the at least one of the right and left mounting portions (325); moving the actuator (360, 1360, 2360, 3360, 5360) from the first actuator position to the second actuator position applies a tension on the control cable (390, 4390, 5390), the tension of the control cable (390, 4390, 5390), via the other one of the at least one of the right and left mounting portions (325), causing the shaft (340) to rotate the right and left rear stoppers (320, 4320, 5320) from the first stopper position to the second stopper position; and moving the actuator (360, 1360, 2360, 3360, 5360) from the second actuator position to the first actuator position releases the tension on the control cable (390, 4390, 5390), the biasing element (330) then biasing the shaft (340) to rotate the right and left rear stoppers (320, 4320, 5320) from the second stopper position to the first stopper position.

CLAUSE 10. The vehicle (10, 2010, 3010) of clause 9, wherein: the control cable (390, 4390, 5390) is connected to the left mounting portion (325); and the biasing element (330) is connected to the right mounting portion (325).

CLAUSE 11. The vehicle (10, 2010, 3010) of clause 8, wherein the biasing element (330, 4330) is a torsion spring (330, 4330).

CLAUSE 12. The vehicle (10, 2010, 3010) of clause 11, wherein the torsion spring (330, 4330) is disposed about an axis of rotation (343) of the shaft (340).

CLAUSE 13. The vehicle (10, 2010, 3010) of clause 1, further comprising: at least one body panel (66) connected to the chassis (16); and wherein a portion of the control cable (390, 4390, 5390) is disposed in an interior of the at least one body panel (66).

CLAUSE 14. The vehicle (10, 2010, 3010) of clause 1, further comprising: a handlebar (84) connected to the chassis (16); and wherein: the actuator (360, 1360, 2360, 3360, 5360) is a twist grip actuator (360, 2360) disposed on the handlebar (84); and the twist grip actuator (360, 2360) is movable between at least the first actuator position and the second actuator position by twisting the twist grip actuator (360, 2360) about the handlebar (84).

CLAUSE 15. The vehicle (10, 2010, 3010) of clause 14, further comprising: a left handle (85) disposed on a left side portion (83) of the handlebar (84); a brake lever (79) disposed on the left side portion (83), the brake lever (79) being connected to a brake fluid reservoir (179), the brake fluid (179) reservoir being connected to the handlebar (84) rightward of the left handle (85); a right handle (85) disposed on a right side portion of the handlebar (84); a throttle lever (77) disposed on the right side portion, a left end portion of the throttle lever (77) being connected to the handlebar (84) leftward of the right handle (85); and wherein the twist grip actuator (360, 2360) is disposed between one of: the left handle (85) and the brake fluid reservoir (179), and the right handle (85) and the left end portion of the throttle lever (77).

CLAUSE 16. The vehicle (10, 2010, 3010) of clause 14, further comprising: a handle (85) disposed on a side portion of the handlebar (84); and wherein the twist grip actuator (360, 2360) is disposed on the handlebar (84) laterally inward of the handle (85).

CLAUSE 17. The vehicle (10, 2010, 3010) of clause 16, wherein the twist grip actuator (360, 2360) is less than 5 cm from a laterally inward edge of the handle (85).

CLAUSE 18. The vehicle (10, 2010, 3010) of clause 14, further comprising: a handlebar riser (81) disposed between the handlebar (84) and the chassis (16); at least one body panel (66) connected to the chassis (16); and wherein the control cable (390, 4390, 5390) runs from the twist grip actuator (360, 2360), along the handlebar (84), along the handlebar riser (81) and in an interior of the at least one body panel (66) to one of the at least one rear stopper (320, 4320, 5320).

CLAUSE 19. The vehicle (10, 2010, 3010) of any one of clauses 1 to 18, further comprising: a handlebar (84) connected to the chassis (16); and wherein: the actuator (360, 1360, 2360, 3360, 5360) is a lever actuator (1360, 5360) disposed on the handlebar (84); and the lever actuator (1360, 5360) is movable between at least the first actuator position and the second actuator position by at least one of: pushing the lever actuator (1360, 5360), and pulling the lever actuator (1360, 5360).

CLAUSE 20. The vehicle (10, 2010, 3010) of any one of clauses 1 to 19, further comprising: at least one body panel (66) connected to and disposed above the chassis (16); and wherein the actuator (360, 1360, 2360, 3360, 5360) is connected to the at least one body panel (66).

CLAUSE 21. The vehicle (10, 2010, 3010) of any one of clauses 1 to 20, further comprising: a handlebar riser (81) connected to the chassis (16); and wherein the actuator (360, 1360, 2360, 3360, 5360) is disposed on the handlebar riser (81).

CLAUSE 22. The vehicle (10, 2010, 3010) of any one of clauses 1 to 21, wherein: the vehicle (10, 2010, 3010) is a snowmobile (10, 2010, 3010); the chassis (16) includes a tunnel (18), the rear suspension assembly (32, 4032) being connected to the tunnel (18); and further comprising: a front right ski (70) connected to a front right portion of the chassis (16); and a front left ski (70) connected to a front left portion of the chassis (16).

CLAUSE 23. The vehicle (10, 2010, 3010) of clause 22, further comprising: a straddle seat (60) disposed on the chassis (16); and wherein the actuator (360, 1360, 2360, 3360, 5360) is disposed forward of the straddle seat (60).

CLAUSE 24. The vehicle (10, 2010, 3010) of clause 22, further comprising: at least one body panel (66); and wherein: the tunnel (18) includes at least one tunnel side wall (18a); the rear suspension assembly (32, 4032) includes at least one front suspension arm (40); and the control cable (390, 4390, 5390) runs from the actuator (360, 1360, 2360, 3360, 5360), through the at least one body panel (66), into an interior of the at least one body panel (66), along an exterior of the at least one tunnel side wall (18a), through the at least one tunnel side wall (18a), along one of the at least one front suspension arm (40), and along the one of the left and right slide rail (38).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A vehicle, comprising:
  a chassis;
  at least one seat connected to the chassis;
  a motor connected to the chassis;
  an endless drive track disposed below the chassis, the endless drive track being operatively connected to the motor for propulsion of the vehicle;
  a rear suspension assembly supporting the endless drive track, the rear suspension assembly comprising:
    a left slide rail,
    a right slide rail,
    at least one rear suspension arm having a first end and a second end, the first end of the at least one rear suspension arm being operatively pivotally connected to at least one of the left and right slide rails, the second end of the at least one rear suspension arm being operatively pivotally connected to the chassis,
    at least one coupling block connected to the at least one rear suspension arm, and
    at least one rear stopper movably connected to the at least one of the left and right slide rails, the at least one rear stopper being movable between a first stopper position and a second stopper position,
    the at least one rear stopper being disposed within a range of motion of the at least one coupling block when in the first stopper position, the at least one coupling block selectively abutting the at least one rear stopper when the first end of the at least one rear suspension arm extends rearward,
    the at least one rear stopper being disposed out of the range of motion of the at least one coupling block when in the second stopper position, motion of the at least one coupling block being unimpeded by the at least one rear stopper when the first end of the at least one rear suspension arm extends rearward;
  a control cable having a first end operatively connected to the at least one rear stopper of the rear suspension assembly; and
  an actuator operatively connected to a second end of the control cable and the at least one rear stopper via the control cable, the actuator being disposed forward of the at least one seat, the actuator being operable by a user during operation of the vehicle,
  the actuator being movable between a plurality of actuator positions including at least a first actuator position and a second actuator position, each of the first stopper position and the second stopper position being related to one of the plurality of actuator positions,
  the at least one rear stopper moving to the first stopper position when moving the actuator to the first actuator position, the at least one rear stopper moving to the second stopper position when moving the actuator to the second actuator position.

2. The vehicle of claim 1, wherein the at least one rear stopper moves between the first stopper position and the second stopper position by rotation.

3. The vehicle of claim 1, further comprising at least one rocker arm having a first end and a second end; and
  wherein:
    the first end of the at least one rocker arm is pivotally connected to at least one of the left and right slide rails; and
    the second end of the at least one rocker arm is pivotally connected to the first end of the at least one rear suspension arm.

4. The vehicle of claim 3, further comprising:
  a cross-member connected to the first end of the at least one rear suspension arm;
  wherein:

the at least one rocker arm includes:
  a right rocker arm pivotally connected to the right slide rail at a first end of the right rocker arm, and
  a left rocker arm pivotally connected to the left slide rail at a first end of the left rocker arm;
the at least one coupling block is operatively connected to one of:
  the right rocker arm, and
  the left rocker arm;
a second end of the right rocker arm is connected to the cross-member;
a second end of the left rocker arm is connected to the cross-member; and
the at least one rear stopper is rotatably connected to:
  the right slide rail if the at least one coupling block is connected to the right rocker arm, and
  the left slide rail if the at least one coupling block is connected to the left rocker arm.

5. The vehicle of claim 4, wherein the at least one coupling block is connected to at least one of the first end of the cross-member and the second end of the cross-member.

6. The vehicle of claim 5, wherein:
the at least one coupling block includes:
  a right coupling block connected to the right rocker arm, and
  a left coupling block connected to the left rocker arm;
the at least one rear stopper includes:
  a right rear stopper connected to the right slide rail, and
  a left rear stopper connected to the left slide rail; and
further comprising:
a shaft connecting to and extending between the right rear stopper and the left rear stopper, the right and left rear stoppers being rotationally fixed with respect to the shaft, the shaft being adapted for rotating the right and left rear stoppers such that the right and left rear stoppers are in a same one of the first and second stopper positions.

7. The vehicle of claim 6, further comprising:
a right mounting portion connected to a right end portion of the shaft, the right rear stopper being connected to the right mounting portion; and
a left mounting portion connected to a left end portion of the shaft, the left rear stopper being connected to the left mounting portion,
the right and left mounting portions being rotationally fixed with respect to the shaft.

8. The vehicle of claim 7, further comprising a biasing element operatively connected to at least one of the right and left mounting portions, the biasing element biasing the right and the left rear stoppers, via the at least one of the right and left mounting portions, toward the first stopper position.

9. The vehicle of claim 8, wherein:
the control cable is connected to one of the right and left mounting portions;
moving the actuator from the first actuator position to the second actuator position applies a tension on the control cable, the tension of the control cable, via the one of the right and left mounting portions, causing the shaft to rotate the right and left rear stoppers from the first stopper position to the second stopper position; and
moving the actuator from the second actuator position to the first actuator position releases the tension on the control cable, the biasing element then biasing the shaft to rotate the right and left rear stoppers from the second stopper position to the first stopper position.

10. The vehicle of claim 9, wherein:
the control cable is connected to the left mounting portion; and
the biasing element is connected to the right mounting portion.

11. The vehicle of claim 8, wherein the biasing element is a torsion spring.

12. The vehicle of claim 11, wherein the torsion spring is disposed about an axis of rotation of the shaft.

13. The vehicle of claim 1, further comprising:
at least one body panel connected to the chassis; and
wherein a portion of the control cable is disposed in an interior of the at least one body panel.

14. The vehicle of claim 1, further comprising:
a handlebar connected to the chassis; and
wherein:
  the actuator is a twist grip actuator disposed on the handlebar; and
  the twist grip actuator is movable between at least the first actuator position and the second actuator position by twisting the twist grip actuator about the handlebar.

15. The vehicle of claim 14, further comprising:
a left handle disposed on a left side portion of the handlebar;
a brake lever disposed on the left side portion, the brake lever being connected to a brake fluid reservoir, the brake fluid reservoir being connected to the handlebar rightward of the left handle;
a right handle disposed on a right side portion of the handlebar;
a throttle lever disposed on the right side portion, a left end portion of the throttle lever being connected to the handlebar leftward of the right handle; and
wherein the twist grip actuator is disposed between one of:
  the left handle and the brake fluid reservoir, and
  the right handle and the left end portion of the throttle lever.

16. The vehicle of claim 14, further comprising:
a handle disposed on a side portion of the handlebar; and
wherein the twist grip actuator is disposed on the handlebar laterally inward of the handle.

17. The vehicle of claim 16, wherein the twist grip actuator is less than 5 cm from a laterally inward edge of the handle.

18. The vehicle of claim 14, further comprising:
a handlebar riser disposed between the handlebar and the chassis;
at least one body panel connected to the chassis; and
wherein the control cable runs from the twist grip actuator, along the handlebar, along the handlebar riser and in an interior of the at least one body panel to one of the at least one rear stopper.

19. The vehicle of claim 1, further comprising:
a handlebar connected to the chassis; and
wherein:
  the actuator is a lever actuator disposed on the handlebar; and
  the lever actuator is movable between at least the first actuator position and the second actuator position by at least one of:
    pushing the lever actuator, and
    pulling the lever actuator.

20. The vehicle of claim 1, further comprising:
at least one body panel connected to and disposed above the chassis; and wherein the actuator is connected to the at least one body panel.

21. The vehicle of claim 1, further comprising:
a handlebar riser connected to the chassis; and
wherein the actuator is disposed on the handlebar riser.

22. The vehicle of claim 1, wherein:
the vehicle is a snowmobile;
the chassis includes a tunnel, the rear suspension assembly being connected to the tunnel; and
further comprising:
 a front right ski connected to a front right portion of the chassis; and
 a front left ski connected to a front left portion of the chassis.

23. The vehicle of claim 22, wherein:
the at least one seat is a straddle seat disposed on the chassis; and
the actuator is disposed forward of the straddle seat.

24. The vehicle of claim 22, further comprising:
at least one body panel; and
wherein:
 the tunnel includes at least one tunnel side wall;
 the rear suspension assembly includes at least one front suspension arm; and
 the control cable runs from the actuator, through the at least one body panel, into an interior of the at least one body panel, along an exterior of the at least one tunnel side wall, through the at least one tunnel side wall, along one of the at least one front suspension arm, and along the one of the left and right slide rail.

* * * * *